US011480998B2

(12) United States Patent
McClure et al.

(10) Patent No.: US 11,480,998 B2
(45) Date of Patent: Oct. 25, 2022

(54) HANDHELD PORTABLE DEVICE

(71) Applicant: Apple Inc., Cupertino, CA (US)

(72) Inventors: Stephen R. McClure, San Francisco, CA (US); Sean S. Corbin, San Jose, CA (US); John P. Ternus, Redwood City, CA (US); Kevin D. Gibbs, San Carlos, CA (US); Jeremy C. Franklin, San Francisco, CA (US); Elvis M. Kibiti, San Francisco, CA (US); John Raff, Menlo Park, CA (US); Jules B. Henry, Palo Alto, CA (US); Benjamin Rappoport, Los Gatos, CA (US); Derek W. Wright, San Francisco, CA (US); Erik A. Uttermann, San Francisco, CA (US); Ming Yu, Saratoga, CA (US); Carl R. Peterson, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 230 days.

(21) Appl. No.: 16/680,424

(22) Filed: Nov. 11, 2019

(65) Prior Publication Data
US 2020/0117235 A1 Apr. 16, 2020

Related U.S. Application Data

(60) Continuation of application No. 15/648,982, filed on Jul. 13, 2017, now Pat. No. 10,474,193, which is a
(Continued)

(51) Int. Cl.
H01Q 1/24 (2006.01)
G06F 1/16 (2006.01)
H01Q 1/42 (2006.01)

(52) U.S. Cl.
CPC .......... *G06F 1/1633* (2013.01); *G06F 1/1626* (2013.01); *H01Q 1/243* (2013.01);
(Continued)

(58) Field of Classification Search
CPC ........ H01Q 1/243; H01Q 1/42; G06F 1/1626; G06F 1/1633
See application file for complete search history.

(56) References Cited

U.S. PATENT DOCUMENTS 1,576,645 A 3/1926 Eskew et al.
3,540,162 A 11/1970 Blackmer et al.
(Continued)

FOREIGN PATENT DOCUMENTS

CN 2639959 9/2004
CN 1989654 6/2007
(Continued)

*Primary Examiner* — Paul D Kim
(74) *Attorney, Agent, or Firm* — Brownstein Hyatt Farber Schreck, LLP

(57) ABSTRACT

A portable computing device is disclosed. The portable computing device can take many forms such as a laptop computer, a tablet computer, and so on. The portable computing device can include at least a single piece housing. The single piece housing can be machined from a single billet of material, such as a billet of aluminum. The single piece housing can include ledges with a surface receiving a trim bead and a cover. Corner brackets can be attached to the single piece housing to improve the damage resistance of the housing.

20 Claims, 15 Drawing Sheets

Related U.S. Application Data continuation of application No. 14/083,811, filed on Nov. 19, 2013, now Pat. No. 9,710,017, which is a division of application No. 13/018,174, filed on Jan. 31, 2011, now Pat. No. 8,587,939.

(52) U.S. Cl.
CPC .............. *H01Q 1/42* (2013.01); *G06F 1/1628* (2013.01); *Y10T 29/49002* (2015.01)

(56) References Cited

U.S. PATENT DOCUMENTS

| | | | |
|---|---|---|---|
| 3,885,925 A | 5/1975 | Tatar | |
| 3,969,007 A | 7/1976 | Lowry | |
| 4,193,227 A | 3/1980 | Uhtenwoldt | |
| 4,492,059 A | 1/1985 | Panetti | |
| 4,574,527 A | 3/1986 | Craxton | |
| 4,662,093 A | 5/1987 | Suttles | |
| 4,800,686 A | 1/1989 | Hirabayashi et al. | |
| 4,977,709 A | 12/1990 | Siden | |
| 5,033,237 A | 7/1991 | Slough et al. | |
| 5,231,587 A | 7/1993 | Frost | |
| 5,419,626 A | 5/1995 | Crockett | |
| 5,493,462 A | 2/1996 | Peter | |
| 5,655,917 A | 8/1997 | Kaneshige et al. | |
| 5,662,515 A | 9/1997 | Evensen | |
| 5,865,668 A | 2/1999 | Stewart | |
| 5,895,311 A | 4/1999 | Shiotani et al. | |
| 5,898,567 A | 4/1999 | Satake | |
| 5,969,506 A | 10/1999 | Neal | |
| 6,151,012 A | 11/2000 | Bullister | |
| 6,201,501 B1 | 3/2001 | Arkko et al. | |
| 6,266,019 B1 | 7/2001 | Stewart et al. | |
| 6,343,945 B1 | 2/2002 | Liikanen | |
| 6,361,897 B1 | 3/2002 | Snyder | |
| 6,490,435 B1 | 12/2002 | Ma et al. | |
| 6,560,092 B2 | 5/2003 | Itou et al. | |
| 6,729,893 B2 | 5/2004 | Ezaki | |
| 6,749,448 B2 | 6/2004 | Bright et al. | |
| 6,764,272 B1 | 7/2004 | Nuxoll | |
| 6,791,825 B1 | 9/2004 | Taylor | |
| 6,842,333 B2 | 1/2005 | Lee et al. | |
| 6,977,808 B2 | 12/2005 | Lam | |
| 7,145,769 B2 | 12/2006 | Chen | |
| 7,230,576 B2 | 6/2007 | Liao et al. | |
| 7,232,181 B2 | 6/2007 | Schmucker | |
| 7,324,308 B2 | 1/2008 | Kimura | |
| 7,331,793 B2 | 2/2008 | Hernandez et al. | |
| 7,333,062 B2 | 2/2008 | Leizerovich et al. | |
| 7,390,242 B2 | 6/2008 | Kim et al. | |
| 7,390,292 B2 | 6/2008 | Kim et al. | |
| 7,494,305 B2 | 2/2009 | Riall et al. | |
| 7,558,054 B1 * | 7/2009 | Prest | H05K 5/0017 361/679.3 |
| 7,626,807 B2 | 12/2009 | Hsu | |
| 7,633,747 B2 | 12/2009 | Yang et al. | |
| 7,652,877 B2 | 1/2010 | Nishizawa | |
| 7,697,281 B2 | 4/2010 | Dabov et al. | |
| 7,821,782 B2 | 10/2010 | Doherty et al. | |
| 7,839,658 B2 | 11/2010 | Kim | |
| 7,852,626 B2 | 12/2010 | Eldershaw | |
| 7,869,206 B2 * | 1/2011 | Dabov | G06F 1/1626 361/679.55 |
| 7,894,185 B2 | 2/2011 | Weber | |
| 7,896,728 B2 | 3/2011 | Schwartz | |
| 7,921,553 B2 | 4/2011 | Wojack et al. | |
| 7,933,123 B2 * | 4/2011 | Wang | G06F 1/1637 361/679.56 |
| 7,947,900 B2 | 5/2011 | Cheng | |
| 7,971,464 B2 | 7/2011 | Hachino et al. | |
| D642,563 S | 8/2011 | Akana et al. | |
| 8,007,551 B2 | 8/2011 | Kaneuchi et al. | |
| 8,081,430 B2 | 12/2011 | Weber et al. | |
| 8,123,070 B2 | 2/2012 | Lim | |
| 8,260,377 B2 | 9/2012 | Paleczny et al. | |
| 8,305,741 B2 | 11/2012 | Chatterjee | |
| 8,345,410 B2 | 1/2013 | Ternus et al. | |
| 8,360,824 B2 | 1/2013 | Harada et al. | |
| 8,363,399 B2 | 1/2013 | Sonehara et al. | |
| 8,421,689 B2 | 4/2013 | Schlub et al. | |
| 8,430,256 B2 | 4/2013 | Allore | |
| 8,432,322 B2 * | 4/2013 | Amm | H01Q 1/245 343/702 |
| 8,466,839 B2 * | 6/2013 | Schlub | H03K 17/955 343/702 |
| 8,537,543 B2 | 9/2013 | Wang et al. | |
| 8,587,939 B2 | 11/2013 | McClure | |
| 8,632,363 B2 * | 1/2014 | Jol | H01R 13/504 439/607.4 |
| 8,947,305 B2 * | 2/2015 | Amm | H01Q 1/245 343/702 |
| 9,317,243 B2 | 4/2016 | Becze | |
| 9,384,672 B1 | 7/2016 | Zehr | |
| 2002/0047807 A1 | 4/2002 | Talvitie | |
| 2002/0057224 A1 | 5/2002 | Shinichi | |
| 2002/0060645 A1 | 5/2002 | Shinichi | |
| 2002/0085342 A1 | 7/2002 | Chen et al. | |
| 2002/0136540 A1 | 9/2002 | Adams | |
| 2002/0160725 A1 | 10/2002 | Toyoda | |
| 2003/0160923 A1 | 8/2003 | Ma | |
| 2004/0197642 A1 | 10/2004 | Sato | |
| 2005/0012723 A1 | 1/2005 | Pallakoff | |
| 2005/0026472 A1 | 2/2005 | Lee | |
| 2005/0242773 A1 | 11/2005 | Bui | |
| 2006/0056138 A1 | 3/2006 | Chen | |
| 2006/0111032 A1 | 5/2006 | Weston et al. | |
| 2006/0164800 A1 | 7/2006 | McEwan | |
| 2006/0197750 A1 | 9/2006 | Kerr | |
| 2006/0203439 A1 | 9/2006 | Lim | |
| 2006/0223570 A1 | 10/2006 | Zhu et al. | |
| 2006/0250762 A1 | 11/2006 | Yang et al. | |
| 2006/0266841 A1 | 11/2006 | Hansen | |
| 2006/0267855 A1 | 11/2006 | Askildsen et al. | |
| 2007/0049175 A1 | 3/2007 | Kim et al. | |
| 2007/0066274 A1 | 3/2007 | Kim et al. | |
| 2007/0081303 A1 | 4/2007 | Lam | |
| 2007/0157993 A1 | 7/2007 | Yoon | |
| 2007/0236870 A1 | 10/2007 | Hachino et al. | |
| 2008/0074329 A1 | 3/2008 | Caballero et al. | |
| 2008/0095394 A1 | 4/2008 | Yoon et al. | |
| 2008/0165063 A1 | 7/2008 | Schlub et al. | |
| 2008/0165485 A1 | 7/2008 | Zadesky | |
| 2008/0187407 A1 | 8/2008 | Tien | |
| 2008/0218955 A1 | 9/2008 | Nishizawa | |
| 2008/0231521 A1 | 9/2008 | Anguera Pros et al. | |
| 2008/0241675 A1 | 10/2008 | Enari | |
| 2008/0310089 A1 | 12/2008 | Wang | |
| 2008/0316117 A1 | 12/2008 | Hill et al. | |
| 2008/0316120 A1 | 12/2008 | Hirota | |
| 2009/0040126 A1 | 2/2009 | Inoue et al. | |
| 2009/0040703 A1 | 2/2009 | Gotham et al. | |
| 2009/0042495 A1 | 2/2009 | Cho et al. | |
| 2009/0072785 A1 | 3/2009 | Moon | |
| 2009/0094903 A1 | 4/2009 | Choul et al. | |
| 2009/0126450 A1 | 5/2009 | Su | |
| 2009/0167616 A1 | 7/2009 | Chen et al. | |
| 2009/0197116 A1 | 8/2009 | Cheng | |
| 2009/0201636 A1 | 8/2009 | Doherty et al. | |
| 2009/0257189 A1 | 10/2009 | Wang et al. | |
| 2009/0257207 A1 | 10/2009 | Wang | |
| 2009/0267677 A1 | 10/2009 | Myers et al. | |
| 2009/0309763 A1 | 12/2009 | Pohjonen et al. | |
| 2009/0310580 A1 | 12/2009 | Chapman et al. | |
| 2010/0008514 A1 | 1/2010 | Bates et al. | |
| 2010/0053853 A1 | 3/2010 | Allore et al. | |
| 2010/0056231 A1 | 3/2010 | Weiss | |
| 2010/0061040 A1 | 3/2010 | Dabov | |
| 2010/0076583 A1 | 3/2010 | Wojack et al. | |
| 2010/0091442 A1 | 4/2010 | Theobald et al. | |
| 2010/0132728 A1 | 6/2010 | Busch | |
| 2010/0149047 A1 | 6/2010 | Tsujimura et al. | |
| 2010/0159803 A1 | 6/2010 | Shore et al. | |
| 2010/0226509 A1 | 9/2010 | Filson | |

(56) References Cited

U.S. PATENT DOCUMENTS

| | | |
|---|---|---|
| 2010/0258463 A1* | 10/2010 | Yang ............... A45C 11/00 206/320 |
| 2010/0271767 A1 | 10/2010 | Weber et al. |
| 2010/0285850 A1 | 11/2010 | Paleczny |
| 2010/0315769 A1 | 12/2010 | Mathew et al. |
| 2010/0321325 A1 | 12/2010 | Springer et al. |
| 2011/0001706 A1 | 1/2011 | Sanford et al. |
| 2011/0007461 A1 | 1/2011 | Moskowitz et al. |
| 2011/0037663 A1 | 2/2011 | Huang et al. |
| 2011/0050560 A1 | 3/2011 | Foster |
| 2011/0050591 A1 | 3/2011 | Kim |
| 2011/0134012 A1 | 6/2011 | Yang |
| 2011/0164471 A1 | 7/2011 | Baarman et al. |
| 2011/0166690 A1 | 7/2011 | Ternus et al. |
| 2011/0189924 A1 | 8/2011 | Erickson |
| 2011/0293133 A1 | 12/2011 | Yan et al. |
| 2011/0297578 A1 | 12/2011 | Stiehl et al. |
| 2012/0050988 A1* | 3/2012 | Rothkopf ............ H04M 1/0266 361/688 |
| 2012/0051025 A1* | 3/2012 | Jol ................... H01R 13/6583 361/818 |
| 2012/0053711 A1* | 3/2012 | Shedletsky ............ H04R 1/403 700/94 |
| 2012/0061473 A1 | 3/2012 | Forster |
| 2012/0088542 A1 | 4/2012 | Choi et al. |
| 2012/0106077 A1 | 5/2012 | Tracy |
| 2012/0133560 A1 | 5/2012 | Tang |
| 2012/0169547 A1 | 7/2012 | Oh |
| 2012/0194393 A1 | 8/2012 | Uttermann et al. |
| 2012/0194998 A1 | 8/2012 | McClure et al. |
| 2012/0249378 A1 | 10/2012 | Li |
| 2013/0223836 A1 | 8/2013 | Gibbs et al. |

FOREIGN PATENT DOCUMENTS

| | | |
|---|---|---|
| CN | 201197159 | 2/2009 |
| CN | 101540451 | 9/2009 |
| CN | 201491423 | 5/2010 |
| TW | 200616414 | 5/2006 |
| TW | 200711564 | 3/2007 |
| TW | M313872 | 6/2007 |
| TW | 200725979 | 7/2007 |
| TW | 200913370 | 3/2009 |
| TW | 200939929 | 9/2009 |
| TW | M390005 | 10/2010 |
| WO | WO2009/126480 | 10/2009 |

* cited by examiner

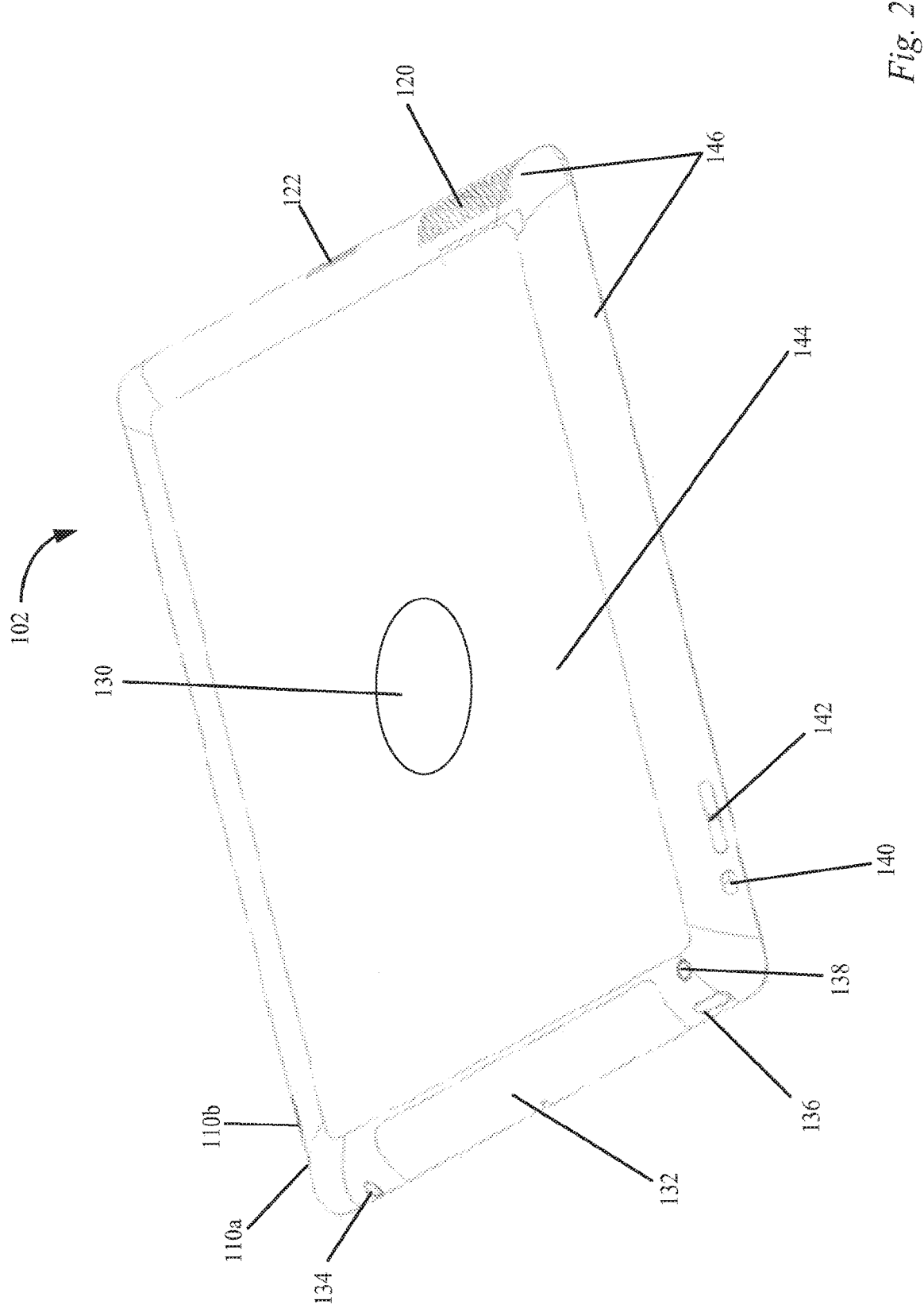

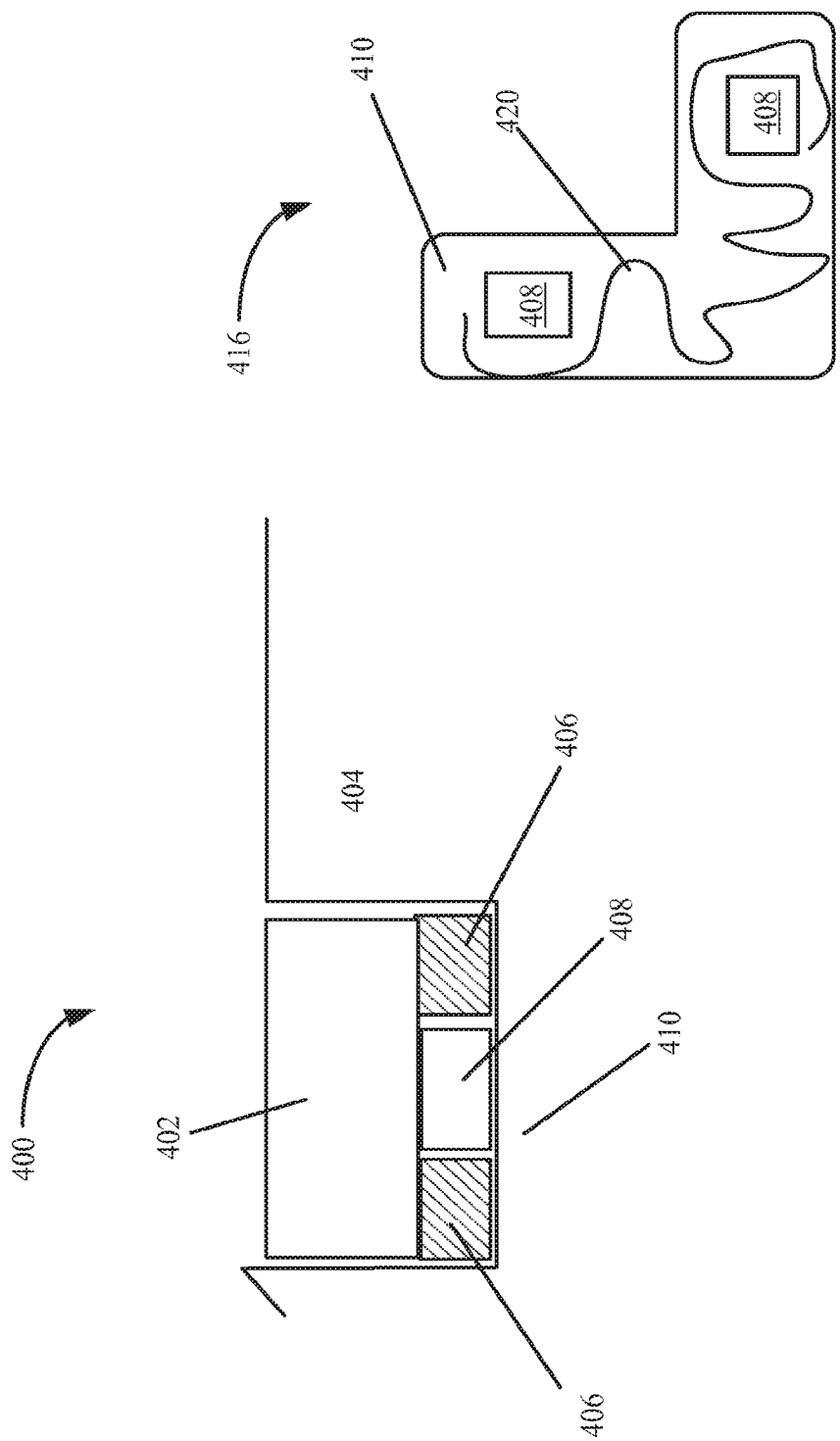

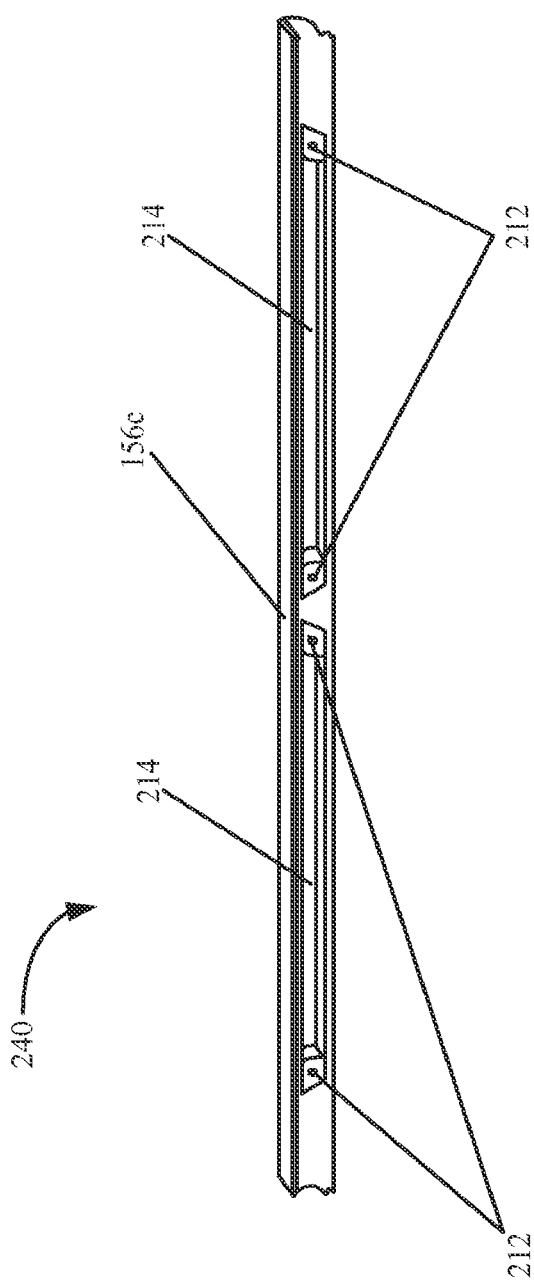

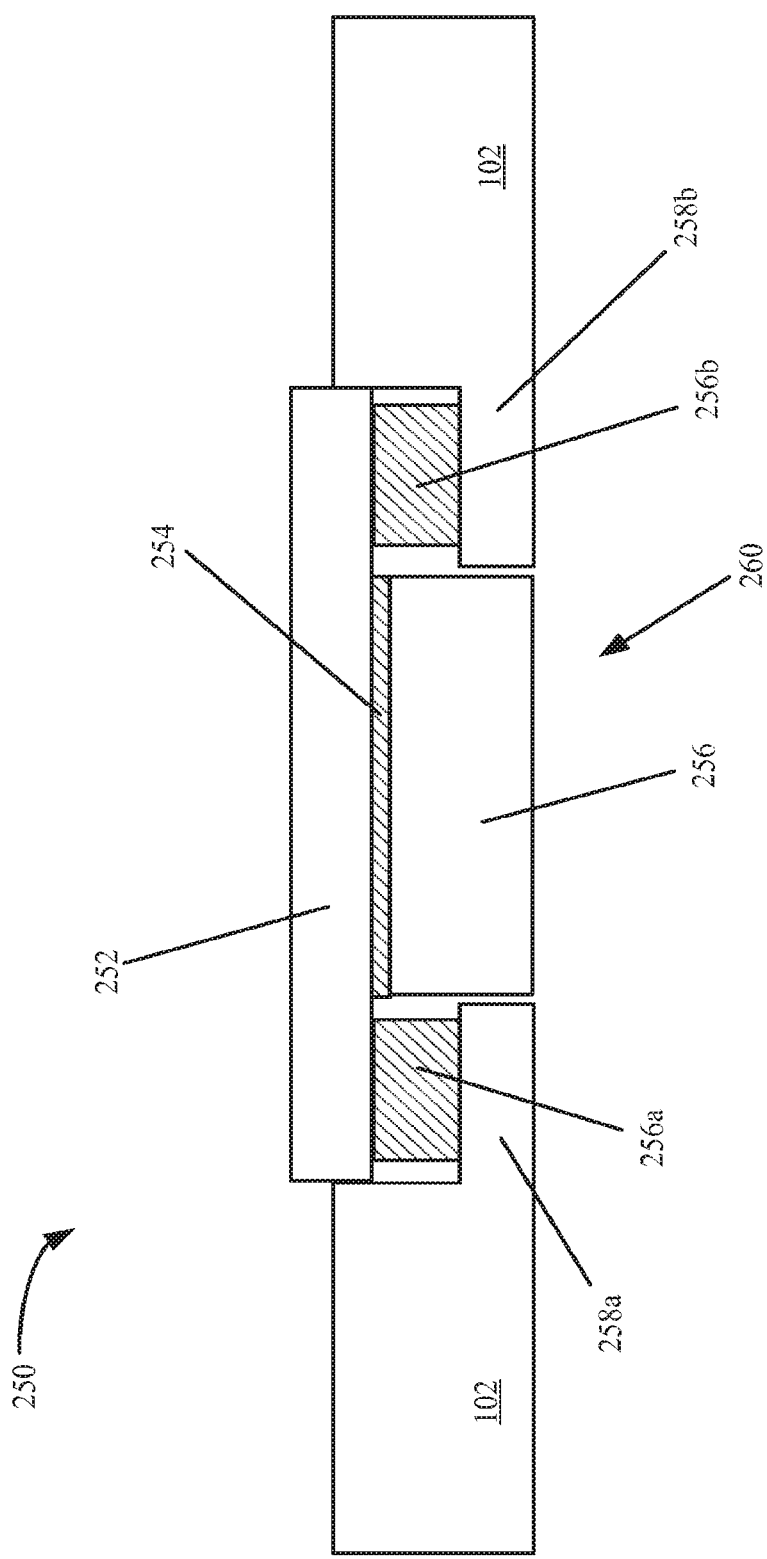

HANDHELD PORTABLE DEVICE

CROSS-REFERENCE TO RELATED APPLICATION(S)

This patent application is a continuation patent application of U.S. patent application Ser. No. 15/648,982, filed Jul. 13, 2017 and titled "Handheld Portable Device", now U.S. Pat. No. 10,474,193, which is a continuation patent application of U.S. patent application Ser. No. 14/083,811, filed Nov. 19, 2013 and titled "Method for Forming a Housing for an Electronic Device", now U.S. Pat. No. 9,710,017, which is a divisional patent application of U.S. patent application Ser. No. 13/018,174, filed Jan. 31, 2011 and titled "Portable Electronic Device," now U.S. Pat. No. 8,587,939, the disclosures of which are hereby incorporated herein by reference in their entireties.

This patent application is also related to and incorporates by reference in their entireties the following patent applications:

(i) U.S. patent application Ser. No. 13/018,239, filed Jan. 31, 2011 and titled "Flat Object Ejector Assembly," now U.S. Pat. No. 8,460,018;

(ii) U.S. patent application Ser. No. 13/018,184, filed Jan. 31, 2011 and titled "Antenna, Shielding and Grounding," now U.S. Pat. No. 8,665,160;

(iii) U.S. patent application Ser. No. 13/018,153, Jan. 31, 2011 and titled "Components Assembly," now U.S. Pat. No. 8,570,736; and (iv) U.S. patent application Ser. No. 13/018,242, filed Jan. 31, 2011 and titled "Machining Process and Tools," now U.S. Pat. No. 8,911,280.

FIELD

The described embodiments relate generally to portable computing devices such as laptop computers, tablet computers, and the like. More particularly, enclosures of portable computing devices and methods of assembling portable computing devices are described.

BACKGROUND

In recent years, portable computing devices such as laptops, PDAs, media players, cellular phones, etc., have become small, light and powerful. One factor contributing to this reduction in size can be attributed to the manufacturer's ability to fabricate various components of these devices in smaller and smaller sizes while in most cases increasing the power and or operating speed of such components. The trend of smaller, lighter and powerful presents a continuing design challenge in the design of some components of the portable computing devices.

One design challenge associated with the portable computing device is the design of the enclosures used to house the various internal components. This design challenge generally arises from a number conflicting design goals that includes the desirability of making the enclosure lighter and thinner, the desirability of making the enclosure stronger and making the enclosure more esthetically pleasing. The lighter enclosures, which typically use thinner structures and fewer fasteners, tend to be more flexible and therefore they have a greater propensity to buckle and bow when used while the stronger and more rigid enclosures, which typically use more substantial structures and include fasteners, tend to be thicker and carry more weight. Unfortunately, however, the increased weight consistent with the more rugged enclosure can lead to user dissatisfaction whereas bowing of enclosures formed of lightweight material can result in damaging some of the internal components (such as printed circuit boards) of the portable device.

Furthermore, the enclosures are mechanical assemblies having multiple parts that are screwed, bolted, riveted, or otherwise fastened together at discrete points. These assembly techniques typically complicate the housing design and create aesthetic difficulties because of undesirable cracks, seams, gaps or breaks at the mating surfaces and fasteners located along the surfaces of the housing. For example, a mating line surrounding the entire enclosure is produced when using an upper and lower casing. Moreover, the various components and complicated processes used to manufacture the portable device can make assembly a time consuming and cumbersome process requiring, for example, a highly trained assembly operator working with special tools.

Another challenge is related to techniques for mounting structures within the portable computing devices. Conventionally, the structures have been laid over one of the casings (upper or lower) and attached to one of the casings with fasteners such as screws, bolts, rivets, etc. That is, the structures are positioned in a sandwich like manner in layers over the casing and thereafter fastened to the casing. This methodology suffers from the same drawbacks as mentioned above, i.e., assembly is a time consuming and cumbersome process.

In view of the foregoing, there is a need for improved component density and associated assembly techniques that reduce cost and improve outgoing quality. In addition, there is a need for improvements in the manner in which handheld devices are assembled such as improvements that enable structures to be quickly and easily installed within the enclosure. It is also desirable to minimize the Z stack height of the assembled components in order to reduce the overall thickness of the portable computing device and thereby improve the overall aesthetic look and feel of the product.

SUMMARY

A portable computing device is disclosed. The portable computing device can take many forms such as a laptop computer, a tablet computer, and so on. In one embodiment, the portable computing device can include at least a single piece housing having a surface for receiving a trim bead and a transparent cover, such that the transparent cover is supported by the housing. The single piece housing can include an integral bottom and side walls that cooperate to form an interior cavity. The exterior surface of the housing can have a substantially flat bottom joined by curved walls. The interior cavity can include a substantially flat bottom portion for mounting battery packs and other components, such as PCB boards. Various structures including ledges, alignment points, attachment points, openings and support structures can be formed in the sidewalls and bottom surfaces of the interior cavity. Ledges around a perimeter of the interior cavity can include a surface for receiving a trim bead and a transparent cover to the housing. In one embodiment, around the perimeter of the cavity, corner brackets can be mounted. The corner brackets can be configured to reduce damage resulting from an impact at the corners.

In one aspect, the single piece housing can be machined from a single billet of material, such as rectangular block of aluminum, using computer numerical controlled (CNC) machine tools and associated techniques. In one embodiment, the single piece housing can be generated by 1) machining the billet to form an exterior surface of the housing, the exterior surface including curved side walls transitioning into a substantially flat bottom surface; 2) machining the billet to form an interior cavity, a portion of the interior cavity substantially flat and parallel to the substantially flat bottom surface; 3) machining the billet to form interior sidewalls to form ledges that extends from the sidewalls, the ledges including a surface, proximately parallel to the flat bottom surface, for receiving a trim bead and a cover and 4) machining the billet to form support shelves for attaching corner brackets to the housing.

In particular embodiments, the corner brackets can be attached to the support shelves using an adhesive and a conductive foam to increase a stiffness and hence, the damage resistance of the housing to impact events. The conductive foam can ground the corner bracket to the remainder of the housing to ensure good antenna performance. The corner brackets can include a surface for receiving corner portions of a trim bead and a cover. The corner brackets can be installed such that a top portion of the surface on the corner brackets for receiving the trim bead is aligned with surfaces for receiving the trim bead formed on ledges of the single piece housing adjacent to the corner bracket. In one embodiment, the surface for receiving the trim bead on the corner brackets can be castellated to increase the strength of the housing proximate to the castellation.

In yet other embodiments, a number of openings can be machined into the single piece housing to provide access to the interior cavity from the exterior of the housing. For example, a first opening in the single piece housing can be formed to allow a SIM tray for supporting a SIM card to extend from the interior cavity through and above one of the sidewalls and a second opening in the single piece housing, adjacent to the first opening, can be formed for allowing access to an ejector mechanism that causes the SIM tray to extend from the interior of the cavity. As another example, an opening can formed in a bottom portion of the housing that is configured to receive a logo stack including a logo insert bonded to a metal sheet. In yet another example, a number of openings can be formed in a curved exterior sidewall of the housing to allow sound from a speaker to exit the housing. The holes can be machined from the exterior to the interior in a direction that is normal to the local curvature of the sidewall.

In yet another embodiment, the housing can be designed such that during a failure of the cover some structural integrity is maintained. In one example, adhesive, such as an adhesive tape, can be applied to a bottom portion of the cover. In the event of a cover failure, the adhesive tape, can hold pieces of the cover together and prevent the cover from breaking into shards.

BRIEF DESCRIPTION OF THE DRAWINGS

The embodiments will be readily understood by the following detailed description in conjunction with the accompanying drawings, wherein like reference numerals designate like structural elements, and in which:

FIG. 2 shows a perspective view of an exterior portion of a housing in accordance with the described embodiments.

FIG. 4B shows a stack-up for attaching a corner bracket to the housing in accordance with the described embodiments.

FIG. 5A shows a perspective view of one side of the housing including an under ledge portion in accordance with the described embodiments.

FIG. 8 shows a side view of a logo stack-up in accordance with the described embodiments.

DETAILED DESCRIPTION

Figure 1A:
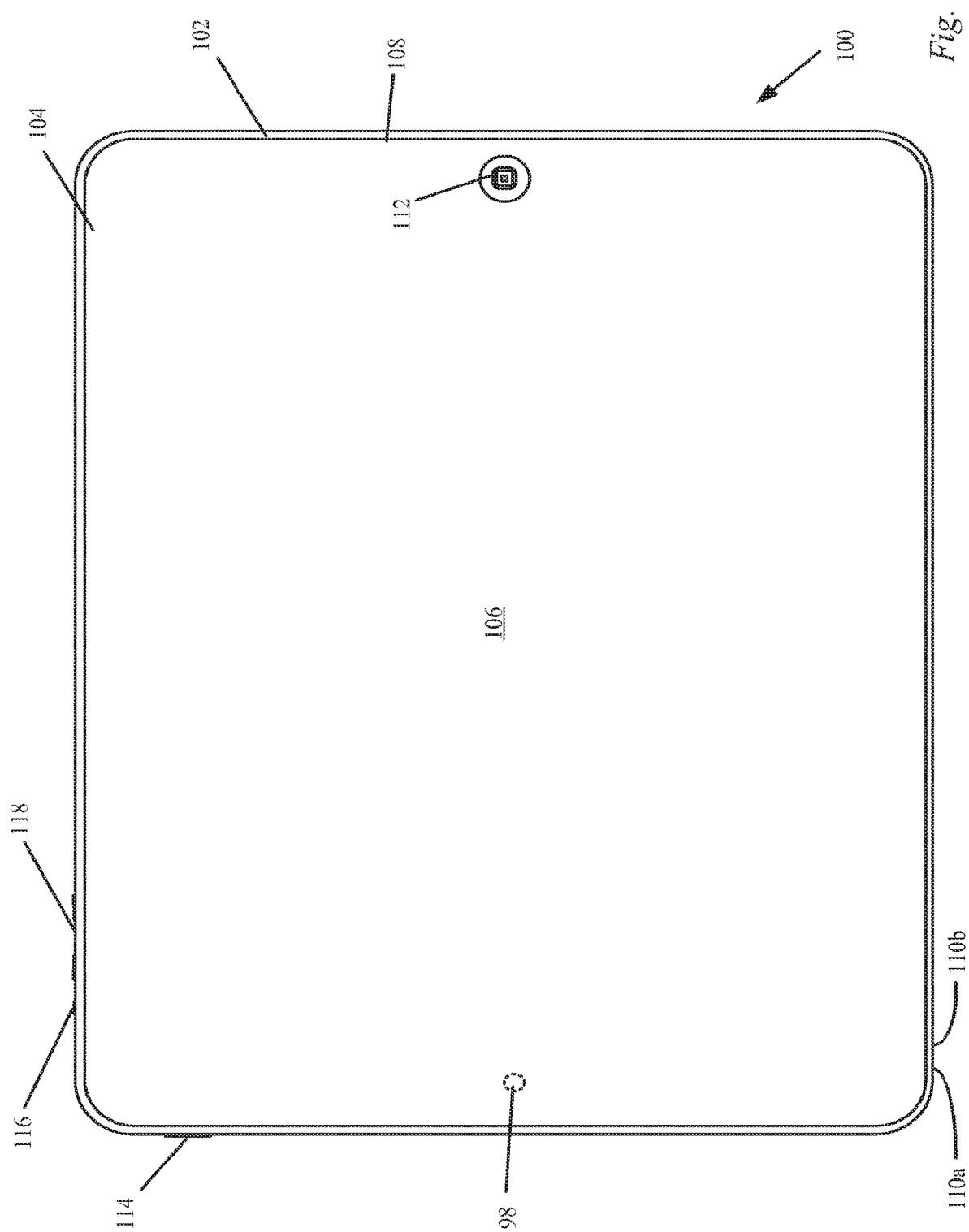
FIG. 1A shows a top view of a portable computing device in accordance with the described embodiments.

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

This paper discusses an aesthetically pleasing portable computing device that is easy to carry with one hand and operate with the other. The portable computing device can be formed of a single piece housing and an aesthetically pleasing protective top layer that can be formed of any of a number of durable and strong yet transparent materials such as highly polished glass or plastic. For the remainder of this discussion, however, the protective top layer can take the form of highly polished cover glass without any loss in generality. Furthermore, the uniformity of the appearance of the portable computing device can be enhanced since (unlike conventional portable computing devices) the cover glass can be mounted to the single piece housing without the use of a bezel. This simplicity of design can accrue many advantages to the portable computing device besides those related to aesthetic look and feel. For example, fewer components and less time and effort can be required for assembly of the portable computing device and the absence of seams in the single piece housing can provide good protection against environmental contamination of internal components. Moreover, the ability of the portable computing device to successfully withstand applied loads (such as from day to day use) as well as those from less frequent but potentially more damaging events such as being dropped can be substantially improved over conventional portable computing devices.

In the described embodiments, the single piece housing can be formed from plastic or metal. In the case where the single piece housing is formed of metal, the metal can take the form of a single sheet (such as aluminum). The single sheet of metal can be formed into a shape appropriate for housing various internal components as well as providing various openings into which switches, connectors, displays, and so on can be accommodated. The single piece housing can be forged, molded, or otherwise processed into a desired shape. In one embodiment, a billet of material, such as a rectangular billet of material, can be machined to form a single-piece housing.

The shape of the housing can be asymmetric in that an upper portion of the housing can formed to have a substantially different shape than that exhibited by a lower portion of the housing. For example, the upper portion of the housing can have surfaces that meet at distinct angles forming well defined boundary whereas the lower portion can be formed to have a substantially flat bottom surface. The transition zone between the upper portion having distinct edges and the lower, substantially flat portion can take the form of an edge having a rounded shape providing both a natural change from the upper portion of the housing (i.e., the area of distinct edges) and the smoother surface presented by the lower portion of the housing. It should also be noted that in addition to providing a more aesthetically pleasing transition, the rounded shape of the edge in the transition zone can provide a more comfortable feel when being held in a user's hand either during use or merely being carried about. One of the advantages to using metal for the housing is ability of metal to provide good electrical grounding for any internal components requiring a good ground plane. For example, performance of a built in RF antenna can be substantially improved when a good ground plane is provided. Moreover, a good ground plane can be used to help mitigate the deleterious effects caused by, for example, of electromagnetic interference (EMI) and/or electrostatic discharge (ESD). However, if an RF antenna is present within the housing, then at least a portion of the housing (if metal) is given over to a radio transparent portion.

It should be noted that throughout the following discussion, the term "CNC" is used. The abbreviation CNC stands for computer numerical control and refers specifically to a computer controller that reads computer instructions and drives a machine tool (a powered mechanical device typically used to fabricate components by the selective removal of material). It should be noted however, that any appropriate machining operation can be used to implement the described embodiments and is not strictly limited to those practices associated with CNC.

These and other embodiments are discussed below with reference to FIGS. 1-11. However, those skilled in the art will readily appreciate that the detailed description given herein with respect to these figures is for explanatory purposes only and should not be construed as limiting.

FIG. 1A illustrates a specific embodiment of portable computing device 100. More specifically, FIG. 1A shows a full top view of fully assembled portable computing device 100. Portable computing device 100 can process data and more particularly media data such as audio, video, images, etc. By way of example, portable computing device 100 can generally correspond to a device that can perform as a music player, game player, video player, personal digital assistant (PDA), tablet computer and/or the like. With regards to being handheld, portable computing device 100 can be held in one hand by a user while being operated by the user's other hand (i.e., no reference surface such as a desktop is needed). For example, the user can hold portable computing device 100 in one hand and operate portable computing device 100 with the other hand by, for example, operating a volume switch, a hold switch, or by providing inputs to a touch sensitive surface such as a display or pad. The device can also be operated while it is resting on a surface, such as a table.

Portable computing device 100 can include single piece housing 102 that can be formed of any number of materials such as plastic or metal which can be forged, molded, machined or otherwise processed into a desired shape. In those cases where portable computing device 100 has a metal housing and incorporates RF based functionality, it may be advantageous to provide at least a portion of housing 102 in the form of radio (or RF) transparent materials such as ceramic, or plastic. An example of a housing including radio transparent portion is described in more detail with respect to FIGS. 2, 3 and 6.

In any case, housing 102 can be configured to at least partially enclose any suitable number of internal components associated with the portable computing device 100. For example, housing 102 can enclose and support internally various structural and electrical components (including integrated circuit chips and other circuitry) to provide computing operations for portable computing device. The integrated circuits can take the form of chips, chip sets, modules any of which can be surface mounted to a printed circuit board, or PCB, or other support structure. For example, a main logic board (MLB) can have integrated circuits mounted thereon that can include at least a microprocessor, semi-conductor (such as FLASH) memory, various support circuits and so on.

Housing 102 can include opening 104 for placing internal components and may be sized to accommodate a display assembly or system suitable for providing a user with at least visual content as for example via a display. In some cases, the display system can include touch sensitive capabilities providing the user with the ability to provide tactile inputs to portable computing device 100 using touch inputs. The display system can be formed and installed separately from a cover 106. The cover 106 can be formed of polycarbonate or other appropriate plastic or highly polished glass. Using highly polished glass, the cover 106 can take the form of cover glass substantially filling opening 104. Trim bead 108 can be used to form a gasket between cover glass 106 and housing 102. Trim bead 108 can be formed of a resilient material such as a plastic along the lines of thermoplastic urethane or TPU. In this way, trim bead 108 can provide protection against environmental contaminants from entering the interior of portable computing device 100.

Although not shown, the display panel underlying cover glass 106 can be used to display images using any suitable display technology, such as LCD, LED. OLED, electronic or e-inks, and so on. In one embodiment, the display assembly and cover glass can be provided as an integrated unit for installation into the housing. In another embodiment, the display assembly and the cover glass 106 can be installed separately.

Display assembly may be placed and secured within the cavity using a variety of mechanisms. In one embodiment, the display assembly and the housing 102 can include alignment points for receiving a fixture. The fixture can be used to accurately align the display assembly with the housing. In one embodiment, after the display assembly is aligned with the housing, it can be secured to the housing 102 using fasteners.

Portable computing device 100 can include a number of mechanical controls for controlling or otherwise modifying certain functions of portable computing device 100. For example, power switch 114 can be used to manually power on or power off portable computing device 100. Mute button 116 can be used to mute any audio output provided by portable computing device 100 whereas volume switch 118 can be used to increase/decrease volume of the audio output by portable computing device 100. It should be noted that each of the above described input mechanisms are typically disposed through an opening in housing 102 such that they can couple to internal components. In some embodiments, portable computing device 100 can include an image capture module 98 configured to provide still or video images. The placement may be widely varied and may include one or more locations including for example front and back of the device, i.e., one through the back housing, the other through the display window.

Portable computing device 100 can include a mechanism for wireless communications, as either a transceiver type device or receiver only, such as a radio, portable computing device 100 can include an antenna that can be disposed internal to a radio transparent portion of housing 102 In other embodiments, a portion of housing 102 can be replaced with radio transparent material in the form of an antenna window described in more detail below. In some embodiments, an antenna can be to an underside of the cover glass 106. The radio transparent material can include, for example, plastic, ceramic, and so on. The wireless communications can be based on many different wireless protocols including for example 3G, 2G, Bluetooth, RF, 802.11, FM, AM, and so on. Any number of antennas may be used, which can use a single window or multiple windows depending on the needs of the system.

The portable computing device can be used on a wireless data network, such as a cellular data network. Access to the cellular data network can require the use of a Subscriber Identity Module (SIM) or SIM card. In one embodiment, the device 100 can include an opening 110b that allows a SIM card to inserted or removed. In a particular embodiment, the SIM card can be carried on a SIM card tray that can extend from a side of the housing 102. The housing can include an opening 110a that allows an ejector for the SIM card tray to be actuated such that the SIM card tray is extended from the housing. The openings, 110a and 110b, for the SIM card tray are shown in FIG. 3B.

Figure 1B:
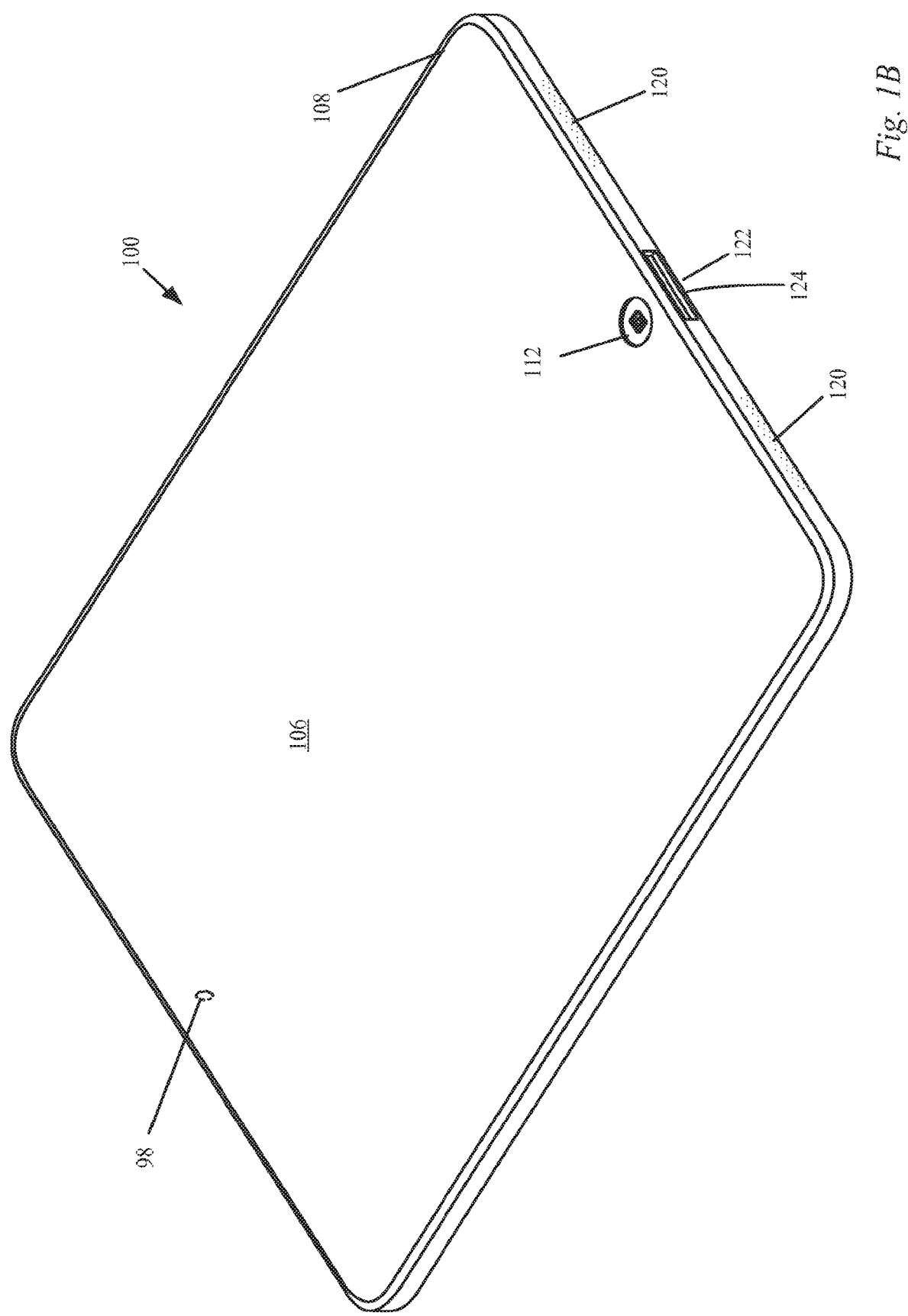
FIG. 1B shows a perspective top view of a portable computing device in accordance with the described embodiments.

FIG. 1B shows a perspective top view of portable computing device 100 in accordance with the described embodiments. As shown in FIG. 1B, portable computing device 100 can include one or more speakers used to output audible sound. The sounds generated by the one or more internal speakers can pass through the housing 102 via speaker grill 120. A portion of the speaker grill can be located on a downward facing side of the housing such that a portion of the sound is angled downward. When the device is placed on a surface, a portion of the sound that is emitted in a downward direction can be reflected off the surface on which a device has been placed. The speaker grill 120 can be formed as a series of small holes that are punched through the sidewalls of the housing. As described in more detail below, the side walls can be curved.

In one embodiment, a bit for punching or drilling the speaker holes can be orientated such that the holes are machined proximately normal to the surface curvature at each location. In some instance, more than one hole can be drilled at a time. For instance, 5 holes can be drilled in a row along a line of constant curvature such that all of the holes are drilled proximately normal to the surface. In one embodiment, cover layers can be placed on the front and back of the housing while the holes are being machined. For example, a stainless sheet can be placed over the exterior surface of the housing and a plastic backing can be placed over the interior of the housing. The external and internal covers can prevent damage to the surrounding housing resulting from chips of material that are generated in the machining process. Generating the holes in this manner can produce a smooth surface where the presence of the holes is not noticeable to the touch.

After the speaker grill holes are formed, a protective layer can be added on an interior surface of the housing that covers the speaker grill holes. The protective layer can be designed to prevent ingress of environmental contaminants, such as water, that can potentially enter into the interior of the cavity via the speaker grill holes. In one embodiment, the protective layer can be formed from a hydrophobic fabric mesh that is acoustically permeable to allow sound through the speaker grill 120 while reducing the risk of environmental ingress.

Returning to FIG. 1B, portable computing device 100 can also include one or more connectors for transferring data and/or power to and from portable computing device 100. For example, portable computing device 100 can include multiple data ports, one for each configuration of portrait mode and landscape mode. However, the currently described embodiment includes single data port 122 that can be formed of connector assembly 124 accommodated within an opening formed along a first side of housing 102. In this way, portable computing device 100 can use data port 122 to communicate with external devices when portable computing device 100 is mounted in docking station. It should be noted that in some cases, portable computing device 100 can include an orientation sensor or an accelerometer that can sense the orientation or movement of portable computing device 100. The sensor can then provide an appropriate signal which will then cause portable computing device 100 to present visual content in an appropriate orientation.

Connector assembly 124 can be any size deemed appropriate such as, for example, a 30 pin connector. In some cases, the connector assembly 124 can serve as both a data and power port thus obviating the need for a separate power connector. Connector assembly 124 can be widely varied. In one embodiment, connector assembly 124 can take the form of a peripheral bus connector. In one embodiment, a connector assembly with 30 pins can be used. These types of connectors include both power and data functionality, thereby allowing both power delivery and data communications to occur between the portable computing device 100 and the host device when the portable computing device 100 is connected to the host device. In some cases, the host device can provide power to the media portable computing device 100 that can be used to operate the portable computing device 100 and/or charge a battery included therein concurrently with the operating.

FIG. 2 shows a perspective view of an exterior portion of a housing 102 prior to assembly. The exterior portion can act as a bottom portion of the device after assembly. An interior portion of the housing and its associated features, which encloses device components such as a display assembly and main logic board, is described with respect to FIG. 3B. In one embodiment, the housing can be formed via machining of a single billet of material, such as a single billet of aluminum formed into a rectangular shape. In FIG. 2, a portion of the billet can have been machined to form the general outer shape of the exterior portion of the housing. In other embodiments, the billet can be cast into some shape that is closer to the final shape of the housing prior to beginning machining to produce the final housing shape.

The housing 102 includes a substantially flat portion 144 surrounded by curved side walls 146. In one embodiment, the housing 102 can have a maximum thickness of less than 1 cm. In a particular embodiment, the maximum thickness is about 8 mm. In FIG. 2, the geometry is provided for the purposes of illustration only. In different embodiments, the curvature on the side walls, such as 146, and the area of the flat portion 144 can be varied. In one embodiment, rather than a flat portion joined by curved side walls, the sidewalls and flat portion can be combined into a shape with a continuous profile, such as conforming to a continuous spline curve. In yet other embodiments, rather than using curved side walls, the side walls can be substantially flat and joined to the substantially flat portion via a specified radius of curvature.

Openings can be formed in the flat portion 144 and the sidewalls 146. The openings can be used for various purposes that involve functional as wells as cosmetic considerations. In one example, the openings can be used for switches. As shown in FIG. 2, a number of switch openings are formed in the side walls. For instance, opening 136 is for a power control switch, opening 140 is for a slide switch and opening 142 is for a volume switch. In one embodiment, the slide switch can be used to provide muting control. In other embodiments, the slide switch can be used to control other device features. The size of the openings can depend on the size of the switch. For example, opening 142 can be for a volume rocker switch which can be larger than a power control switch or the mute control. In one embodiment, the openings can be formed using a bit that is orientated proximately normal to the surface of the housing 102. Thus, its orientation during machining can vary depending on what location on the side wall is being cut.

In another example, openings can be formed in the housing for external connectors. For example, an opening 134 is provided in the side wall for an audio port, such as for a head phone connector. In yet another example (see FIG. 1B and FIG. 3B), an opening can be provided for an external data and power connector, such as a 30-pin connector. In one embodiment, the opening can be cut in a direction that is proximately parallel to flat portion of housing, which may not be normal to curvature of the exterior surface. Closer to the substantially flat portion 144 of the housing 102, opening 138 is provided for a rear facing image capture device. Near the center of the substantially flat portion, opening 130 is provided for a logo insert. The logo insert can be formed from a different material and be a different color than the remainder of the housing. Further details of the logo insert including a logo stack-up for attaching a logo to the housing are described with respect to FIG. 8.

The housing 102 can be formed from a radio opaque material, such as a metal. In a particular embodiment, the housing can include a cut-out portion for placement an RF antenna window to support one or more antennas. The housing can include a cut-out for receiving the RF antenna window 132. The RF antenna window can be formed from a radio transparent material, such as a plastic, to improve wireless data reception for the device. In FIG. 2, the RF antenna window is shown an installed position extending across the side wall and ending proximate to the substantially flat portion 144 of the housing. The RF antenna window 132 can be shaped to match the surface curvature profiles of the adjacent sidewalls. A view of the RF antenna window 132 and surrounding support structure on the housing as viewed across the interior of the housing is shown and described in more detail with respect to FIG. 6.

In particular embodiments, a device can be configured to access a data network via one or more wireless protocols. For example, using a protocol such as Wi-Fi, a device can be configured to access the Internet via a wireless access point. As another example, using a wireless protocol, such as GSM or CDMA, device can be configured to access a cellular data network via a local cell phone tower. A device implementing two wireless protocols, such as Wi-Fi and GSM or Wi-Fi and CDMA, can employ different antenna system, one for the Wi-Fi and one for the GSM or CDM.

Typically, a component, such as the RF antenna window 132, can be used to implement a cellular data network connection using GSM or CDM. To implement a wireless protocol, such as Wi-Fi, the RF antenna window 132 may not be necessary. Thus, in some embodiments, a housing can be formed without an opening for the RF antenna window 132. In these embodiments, the housing 102 can extend over the surface where RF antenna window 132 is located to conform to the surrounding curvature of the sidewall. Thus, the area where the RF antenna window 132 is located can be formed from the same material as the other portions of the housing 102 and machined in a manner similar to the other sidewalls of the housing.

Figure 3A:
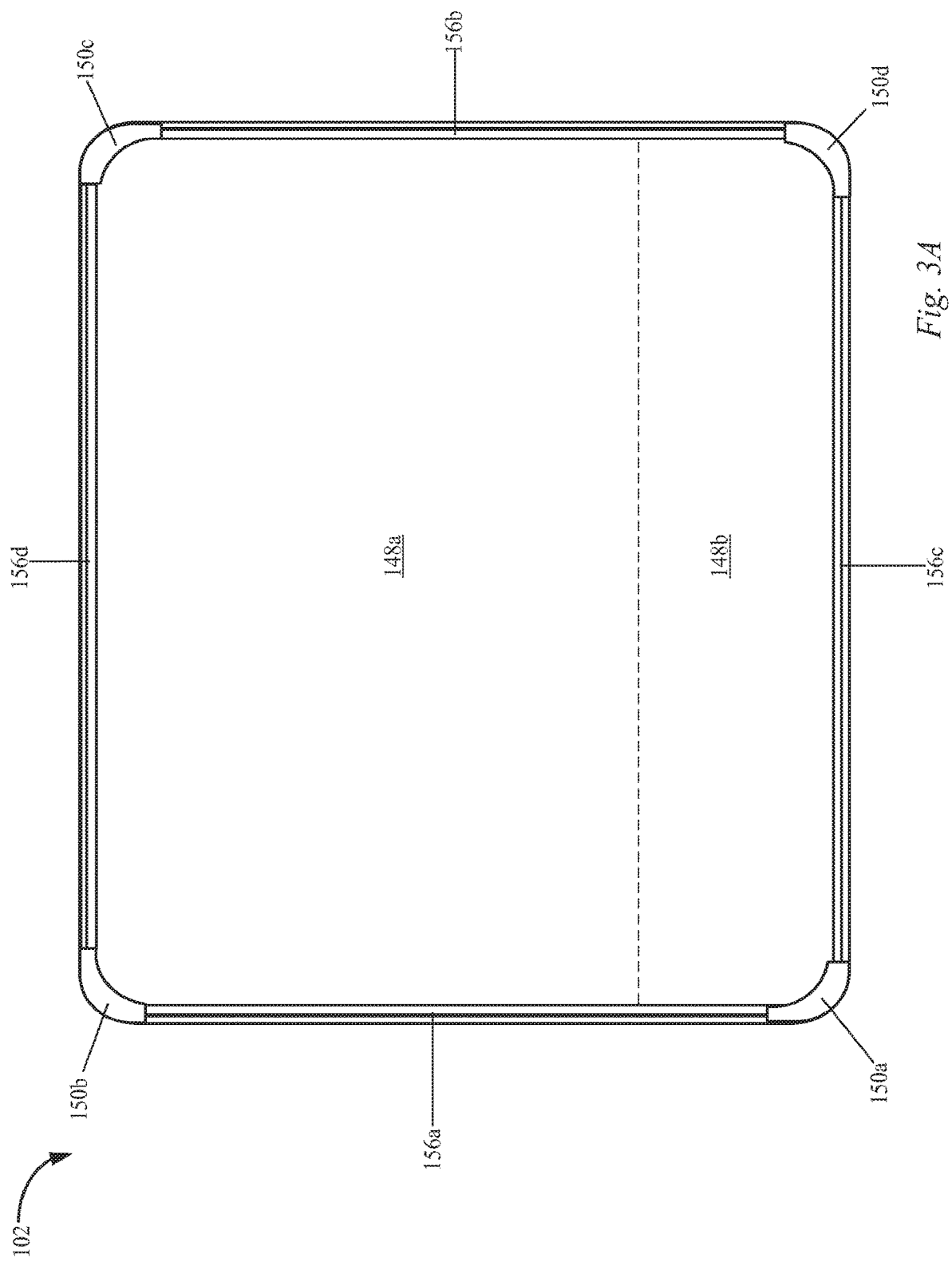
FIG. 3A shows a simplified top view of the interior of the housing in accordance with the described embodiments.
Figure 3B:
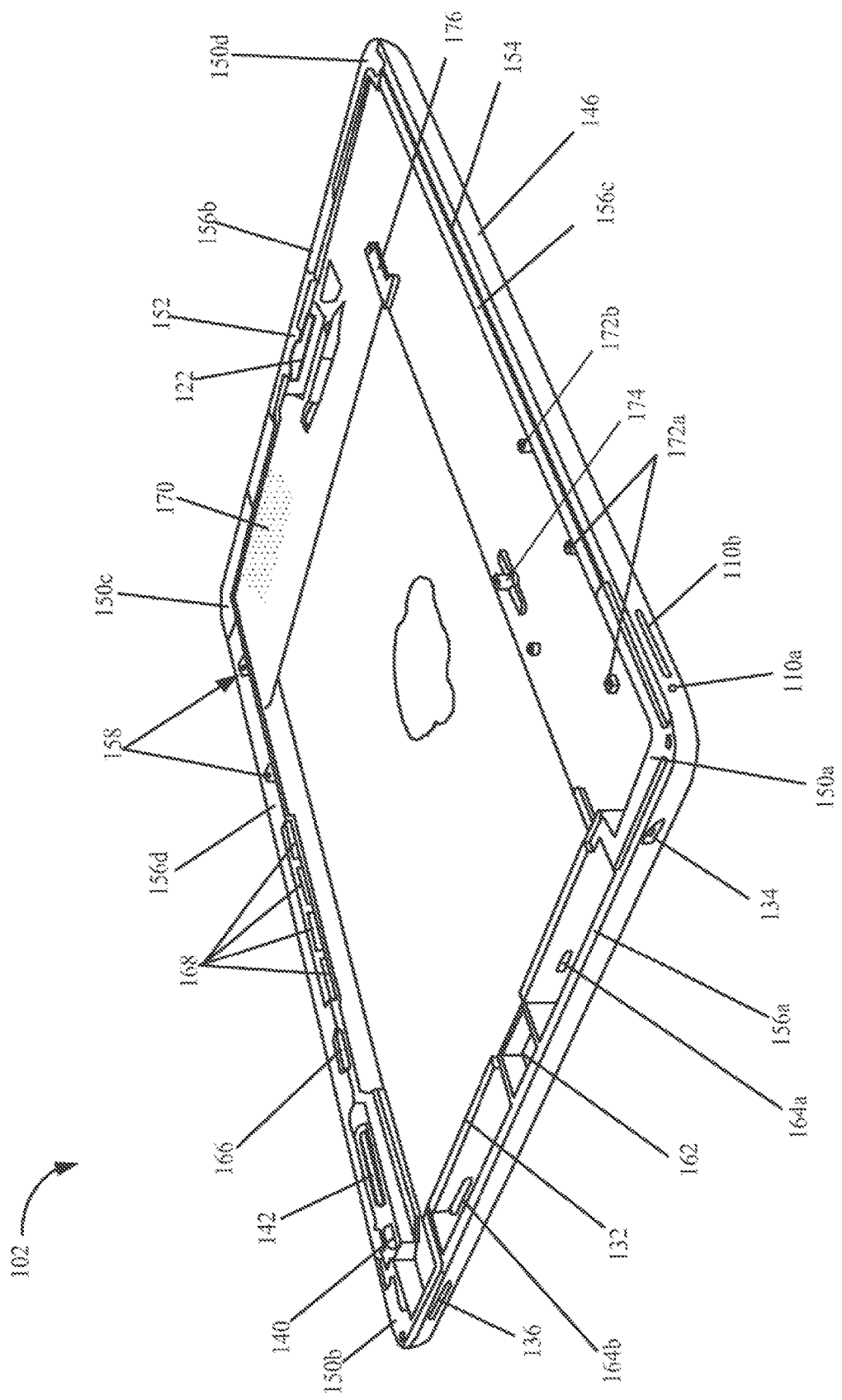
FIG. 3B shows a perspective view of an interior portion of a housing in accordance with the described embodiments.

FIG. 3A shows a top view of a simplified housing 102 showing a cavity with a front opening for one embodiment. A more detailed perspective view of a housing is described with respect to FIG. 3B. In 3A, the housing 102 can include substantially flat bottom portions 148a and 148b. The flat bottom portions, 148a and 148b, can be at different heights or a single height. In one embodiment, the flat bottom portions, 148 and 148b, can be substantially parallel with the flat exterior bottom 144 of the housing described above with respect to FIG. 2. The flat bottom portions, 148a and 148b, can transition into sidewalls that extend above the bottom of the cavity.

The sidewalls can be undercut to form ledges, such as ledges 156a, 156b, 156c and 156d, that extend into the center of the cavity from the sidewalls. In one embodiment, the ledges can include portions at different heights. The width of the ledges can vary across each side and vary from side to side. For instance, the width of the ledge 156a can be thinner than ledge 156d. A ledge is not necessarily continuous across a side. In some embodiments, a portion of each ledge can be removed. In addition, a ledge width is not necessarily constant across a side. In some embodiments, the width of the ledge can vary across a side.

Brackets, such as 150a, 150b, 150c and 150d, can be placed at each corner of the housing. The brackets can be formed from a metal, such as stainless steel. The brackets can be configured to add structural stiffness to the housing. During an impact event, such as an impact to the corner of the housing, the corner brackets can limit the amount of impact damage, such as damage to a cover glass. The shape of the brackets can vary from corner to corner. In addition, the simplified shape of the brackets is shown for the purposes of illustration and brackets with different shapes can be used. As is discussed in more detail as follows, the brackets can be bonded with an adhesive to the housing. In one embodiment, The brackets can include a surface for receiving a corner portion of a trim bead and a cover.

In one embodiment, components, such as the batteries, can be disposed within regions 148a and 148b. For instance, in one embodiment, a number of battery packs can be bonded using PSA strips to the housing in region 148a. In one embodiment, three battery packs can be adhered to flat region 148a using adhesive that can take the form of adhesive strips such as PSA. Using adhesive strips can slightly elevate the batteries and provide room for the batteries packs to expand during operation. As another example, in region 148b, a number of PCBs can be placed. The number and type of PCBs can vary from embodiment to embodiment depending on the functionality of the device. A few examples of PCBs that can be secured to the housing in this region include but are not limited to a main logic board, a battery management unit, and/or a RF circuit board. The RF circuit board can also include GPS circuitry. Attachment points can be machined as bossed into the bottom of the housing to secure device components, such as the PCBs. These are described in more detail with respect to FIG. 3B.

FIG. 3B shows a perspective view of an interior portion of a housing 102. Device components, such as a display, processor boards, memory, audio devices can be secured within a cavity formed by the housing. The housing 102 can include a substantially flat portion in its center that surrounds the opening 136 for the logo insert. As described in more detail with respect to FIG. 8, the opening 136 can include a recessed ledge on which a sheet, such as a metal sheet conforming to the shape of the recessed ledge can be bonded to the housing to seal the opening 136.

A number of structures, such as bosses 172a and 172b or bosses 174 and 176 can be formed on the bottom of the housing. In one embodiment, the bosses can be used with fasteners to secure one or more PCBs to the housing. For example, the bosses can be used to attach a main logic board, a battery management unit board and radio board. The number and types of boards can vary from embodiment to embodiment. For instance, some embodiments do not include a radio board. Thus, the number and types of bosses can vary from embodiment to embodiment. The bosses can include structures with apertures that allow a fastener, such as a metal or plastic screw to be inserted. The structures can be formed by removing material during a CNC based machining process. Attachment points, such as bosses, can also be formed for other components, such as the display assembly or a Wi-Fi antenna.

The housing 102 can include a number of features adjacent to the sidewalls of the housing and arranged around a perimeter of the housing. One example of a feature is an opening in the sidewall. For example, an opening 134 for an audio port, an opening 136 for a power switch, an opening 140 for a mute button, and an opening 142 for a volume switch, which are described above with respect to FIG. 2, and an opening for the data port, which is described above with respect to FIG. 1B, are also visible in FIG. 3. The opening 140 for the mute button, the opening 142 for the volume switch, and the opening 122 for the data port are shown from the interior side of the housing 102. In FIG. 3B, it can be seen that there is structure around the opening on the interior side that is different than the structure around the openings as viewed from the exterior side. In particular, the exterior surface of the housing around the openings is relative smooth without sharp edges while the interior structure around the opening can include steps, ledges, walls and other formations. As discussed above, the exterior and interior portions of the housing can be asymmetric in this regard.

In FIG. 3B, other openings include the speaker hole cut outs 170 as viewed from the interior and the openings for the SIM tray ejector mechanism 110a and SIM tray 110b as viewed from an exterior of the housing 102. The openings for SIM tray ejector mechanism 110a and the SIM tray 110b can be located on the curved sidewalls of the housing 102. In one embodiment, the SIM tray ejector mechanism opening 110a and SIM tray opening 110b can be configured to allow the SIM tray to eject in a plane that is substantially parallel to the bottom flat portion of the housing. However, the opening for the SIM tray ejector mechanism and the SIM tray ejector mechanism can be configured such that opening 110a is drilled about norm to the surface according to the curvature of the sidewall where it is located. The ejector mechanism can be configured to receive an implement, such as a straight pin that is inserted normal to the surface via opening 110a to eject the SIM tray. Thus, when a straight pin is inserted into the opening 110a and the SIM tray is extended from opening 110b, the SIM tray and the pin can be at angle relative to one another.

In particular embodiments, as described with respect to FIG. 3A, the ledges do not necessarily extend around the entire perimeter of the housing or entirely across a side. For example, the housing does not include a ledge proximate to where RF antenna window 132 is placed. In other embodiments that do not include an RF antenna window, the ledge can be extended into the region that is occupied by the RF antenna window. In some locations, it would be difficult to implement an install of a component in the presence of a ledge. At various locations, material can be removed such that the ledge at a location is minimal or no ledge is formed. For example, proximate to the openings 140 and 142 for the mute button and volume switch, respectively, the ledge can be removed and a cavity can be formed for receiving the mute button and volume switch assemblies. The removed material proximate to these openings can allow mechanisms for the mute button and the volume switch to be inserted down into the housing such that a portion of the mechanisms can be accessible from an exterior of the housing via the openings. In one embodiment, the housing of a switch assembly installed in this manner can be shaped such that a level surface aligned with adjacent ledges on the sides of the housing is provided after the switch assembly is installed. The level surface can provide support for an item that is placed over the top of the installed switch assembly, such as the cover glass and trim bead.

In particular embodiments, the ledges around the sides can include a surface 154 for receiving a trim bead 108 and a cover 106 that spans the cavity formed by the interior cavity. As described above, the cover 106 can be formed from a transparent material. When attached, the cover 106 can protect underlying components, such as a display, from damage. Local side views showing the cover 106 and trim bead 108 mounted to the housing are described in more detail with respect to FIGS. 7A and 7B.

Features, such as apertures and/or recesses can be formed in the ledges, 156a, 156b, 156c and 156d. For example, two recesses 158 can be formed in side ledge 156d to allow a speaker assembly to be coupled to the housing. The recesses can include an aperture that allows a fastener to be inserted to secure the speaker assembly. In another example, a recess 166 can be formed in side ledge 156d that provides a mounting point for a hall effect sensor. In yet another example, side ledge 156d can include a number of recesses, such as four recesses 168, that can extend into an upper surface of side ledge 156d as well as underneath the side ledge 156d. In one embodiment, the recesses 168 can be configured to allow magnet assemblies to be mounted to the housing 102. The magnet assemblies can be used to secure a cover device that also includes magnets to housing 102.

In one embodiment, a number of brackets can be coupled to the housing 102 to strengthen the housing in particular regions. For instance, the data port opening 122 is relatively large, which can weaken the housing in the area surrounding the opening 122. To strengthen the housing around the data port opening 122, a bracket 152 can be added above the opening. The bracket can be formed from a material, such as a metal. In one embodiment, the bracket can be configured to be attached to the housing, such that it is aligned with the surface 154 for receiving the trim bead. Thus, a portion of the trim bead can be disposed on a bracket, such as bracket 152.

As another example, brackets 150a, 150b, 150c and 150d can be located at each of the respective corners of housing 102. The corner brackets can be used to improve a resistance of the device to impact damage, such as impact damage resulting from the device being dropped on its corners. The impact damage can be reduced because the corner brackets add stiffness that can reduce deformation during an impact event. In one embodiment, the brackets can include a surface for receiving the trim bead 108 that aligns with the surface for receiving the trim bead formed in the side ledges. In addition, when mounted, the brackets can extend towards the interior of the housing to form a ledge, like the side ledges machined into the housing 102. Further details of the corner brackets are described in more detail with respect to FIGS. 4A and 4B as follows.

Figure 4A:
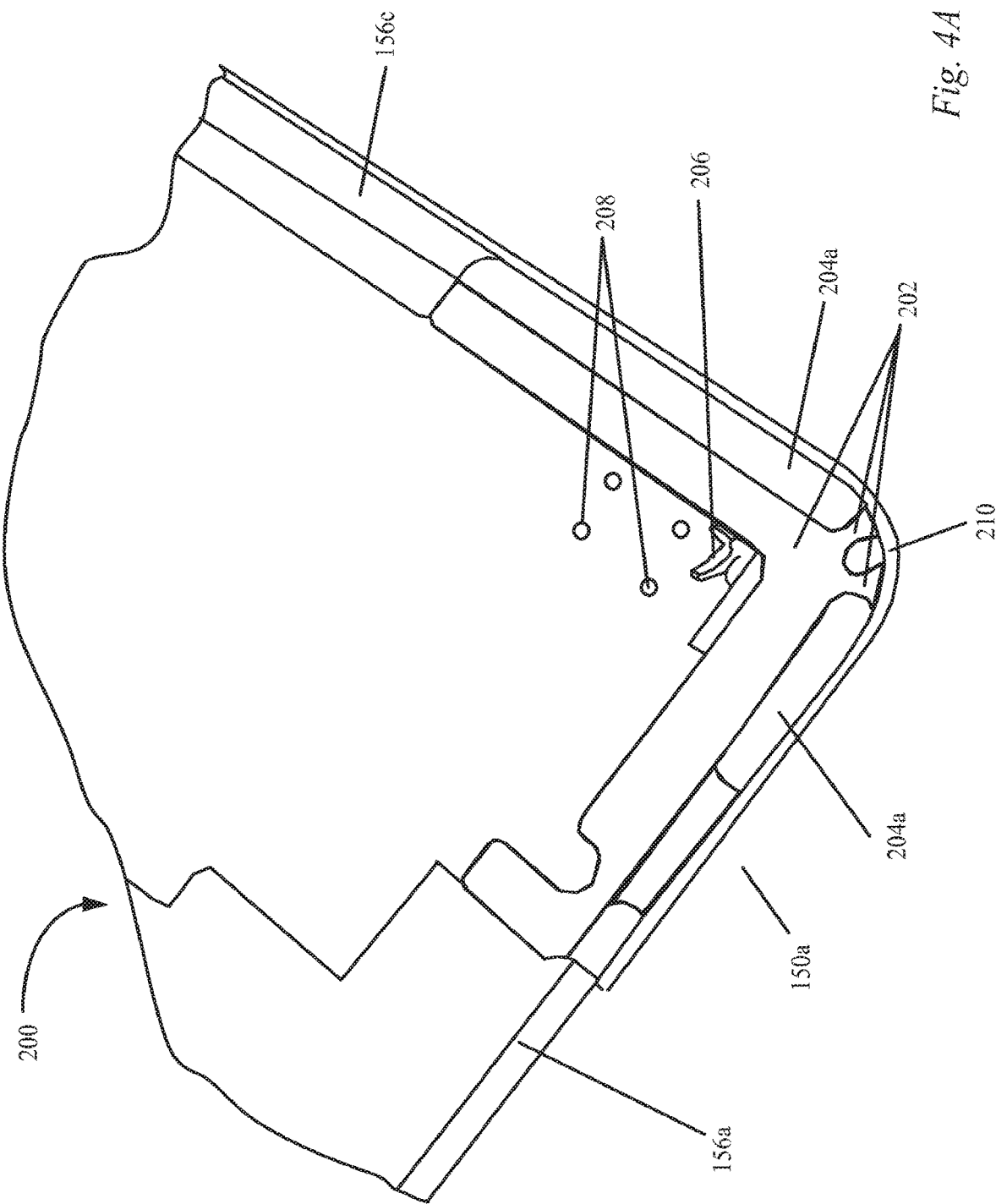
FIG. 4A shows a perspective view of one corner of the housing in accordance with the described embodiments.

FIG. 4A shows a perspective view of one corner 210 of the housing 102. In one embodiment, the SIM tray mechanism can be mounted in corner 210 to utilize openings in the housing 110a and 110b shown in FIG. 3B. One component 206 of the SIM tray mechanism is shown already installed. The housing 102 can include apertures 208. The apertures can be used with fasteners to secure additional components associated with the SIM tray mechanism.

Corner bracket 150a extends around corner 210 to join side ledge 156c and top ledge 156a. The top and side ledges can be formed by undercutting portions of the housing billet during the machining process. A support shelf at a lower height can be formed beneath the height of the ledges 156c and 156a and the corner bracket. If desired, the support shelf can be undercut like the surrounding ledges. In the corners, the support shelf for the corner bracket 150a does not have to extend all around the corner. Material can be removed to allow a component, such as the SIM tray mechanism 206, to be installed.

In one embodiment, the corner brackets can be bonded to the support shelf using a liquid adhesive. A conductive foam can be placed between the corner bracket and the support shelf to ground the metal bracket to the rest of the structure. Details of a bonding scheme and a stack-up for a corner bracket are described in FIG. 4B.

The use of strengthening brackets is not limited to use around a corner and could also be used at other locations, such as between the corners. For example, a portion of ledge 156c can be removed to allow a component to be installed. Then, a bracket that extends just along this side, as opposed to around a corner, could be used to re-form the ledge over the installed component. The bracket may possibly strengthen the housing in the region where the ledge material is removed and replaced with a bracket. In some embodiments, a portion of a ledge can be removed to form a gap in the ledge, such as to install a component underneath the ledge. However, the gap may not be filled using a bridging structure and the housing can be utilized with a discontinuous ledge.

In one embodiment, the bracket 150a can be formed from a material, such as stainless steel. The shape of bracket can be selected to increase the strength of the housing in the region where it is installed. As an example, the bracket 150a can be castellated in corner 210 to improve impact damage resistance during a corner drop event. The castellation can include raised and sunken portions around corner 210. The raised portions can add additional structure that can strengthen the bracket and dissipate force during an impact event. The amount of castellation, i.e., the number of times the raised and lowered pattern of structure is repeated can be varied. Thus, the example in FIG. 4A is for the purposes of illustration and is not meant to be limiting.

To provide castellation, bracket 150a includes a ledge portion 204a that aligns with a ledge portion on side ledge 156c. Ledge portion 204a can be followed by a raised portion, a sunken portion and another raised portion and then a sunken portion 204b. The sunken portion 204b can be shaped to align with a ledge portion on top side 156a. A castellation pattern can be specified by the local geometry, such as a local height and width of the raised and sunken portions and a number of raised and sunken portions. These parameters can be varied from design to design.

As previously described, the trim bead 108 can extend around from a ledge portion on 156c onto the ledge portion 204a on the bracket 150a, over the top of the castellation, onto ledge portion 204b and then onto a ledge portion of top side 156a. In one embodiment, the shape of the trim bead can be modified to match the castellation pattern. For instance, the trim bead can be thinned where the structure is raised to form the castellation. In other embodiments, if the trim bead can be sufficiently thin or formed from a compressible material, a thickness profile of the trim bead may not be modified to account for the castellation pattern around corner 210. For instance, a trim bead with a uniform thickness can be used over a structural location with castellation proximate to corner 210.

FIG. 4B shows a side view 400 and a top view 416 of a stack-up for bonding a corner bracket to a housing, such as the single piece housing 102, described above with respect to FIGS. 2 and 3. The bracket 402 can be bonded to an underlying support shelf 410 in the housing using an adhesive. One or more pieces of conductive foam can be placed between the support shelf 410 and bracket 402 to ground the bracket to the rest of housing. In one embodiment, the support shelf beneath the conductive foam can be laser etched to provide a good conductive surface.

The bracket 402 can be attached to the housing such that a top of the bracket is proximately level with a top height of the adjacent structure 404. In one embodiment, to install the bracket, one or more pieces of conductive foam, such as two pieces of conductive foam can be placed on the support shelf and an adhesive path 420 can be routed around the conductive foam. In one embodiment, the adhesive can be a liquid adhesive. In a particular embodiment, the liquid adhesive can be an acrylic adhesive.

Next, a bracket 402 can be placed on top of the foam pieces and a fixture can be placed over the bracket. The fixture can press down on the bracket 402 such that the bracket is installed at the proper height, such as proximately level with the adjacent structure 404. The conductive foam can be loaded when the fixture presses down to push the bracket against the fixture such that the bracket remains at the desired height. The adhesive path 420 can be selected and can be laid down under CNC control to wet the bottom surfaces of the bracket and expand as the bracket is pressed down but not extend into the area next to and underneath the conductive foam. The adhesive can be laid down in this manner to prevent the adhesive from spreading under the foam such that it interferes with the grounding capabilities of the conductive foam.

In 416, the support shelf 410 is shown as a continuous structure. In other embodiments, a portion of the support shelf can be removed. For example, a portion of the support shelf can be removed such that two islands are formed where each piece of the conductive foam rests on a respective island. The bracket 402 can be bonded to each of the islands.

FIG. 5A shows a perspective view 240 of one side of the housing 102 across the interior bottom surface of the housing and under ledge 156c on a sidewall. Two recesses 214 can be formed under ledge 156c. The two recesses can each include attachments, such as attachment points 212. In one embodiment, each recess can include two attachments points for attaching a device attachment feature to the housing. The device attachment feature can be used to couple a device to the housing 102, such as a cover.

Figure 5B:
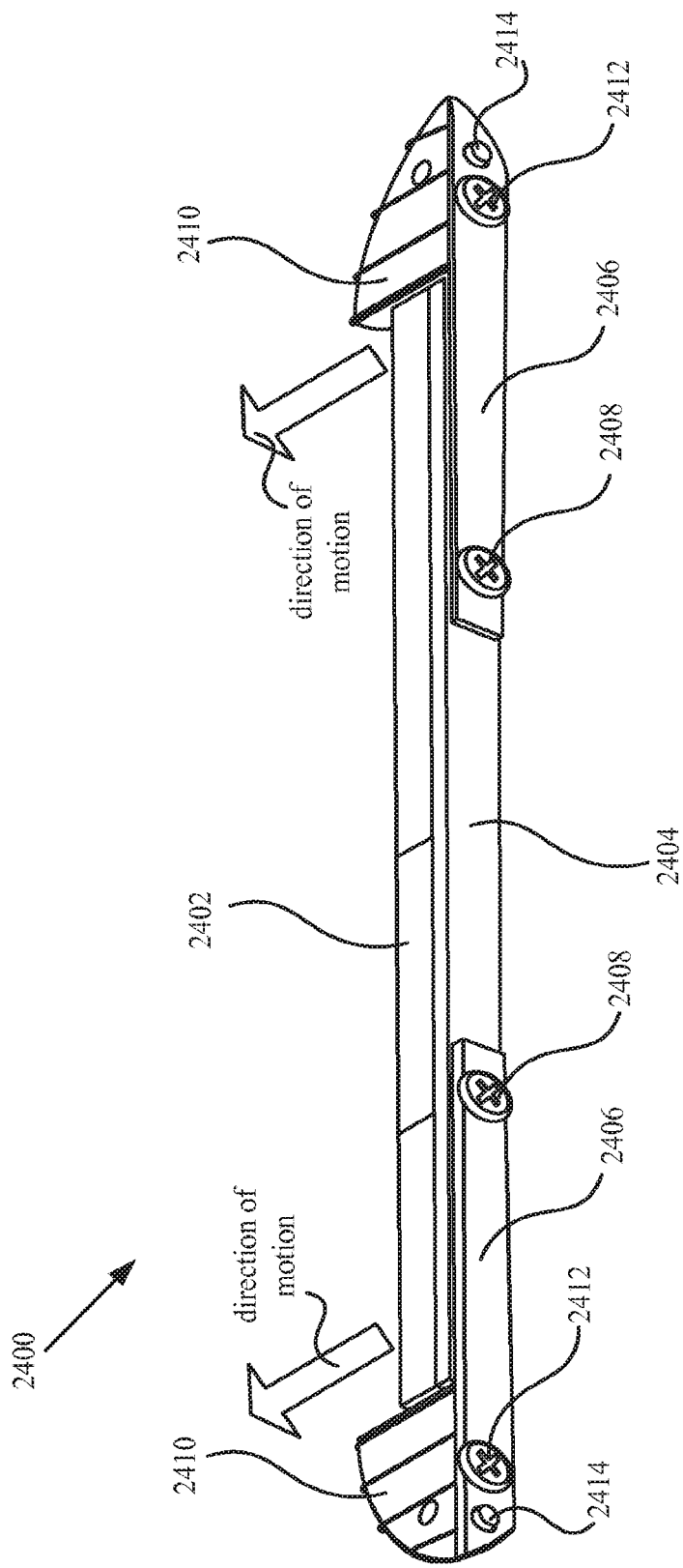
FIG. 5B shows a perspective view of a device attachment feature incorporating a leaf spring as a retaining mechanism in accordance with the described embodiments.

FIG. 5B shows a representation of an embodiment of device attachment feature 2400 that can be attached to the housing 102. In particular, attachment 2400 can include magnetic elements 2402/shunt 2404 in attached to leaf spring 2406. Leaf spring 2406 can be secured directly to shunt 2404 by way of fasteners 2408 and end supports 2410 by way of fasteners 2412. End supports 2410 can be attached to a support structure such as a housing to provide support for attachment feature 2400. In one embodiment, alignment posts 2414 can be used during assembly to provide alignment for both end supports 2410 and leaf spring 2406.

Figure 6:
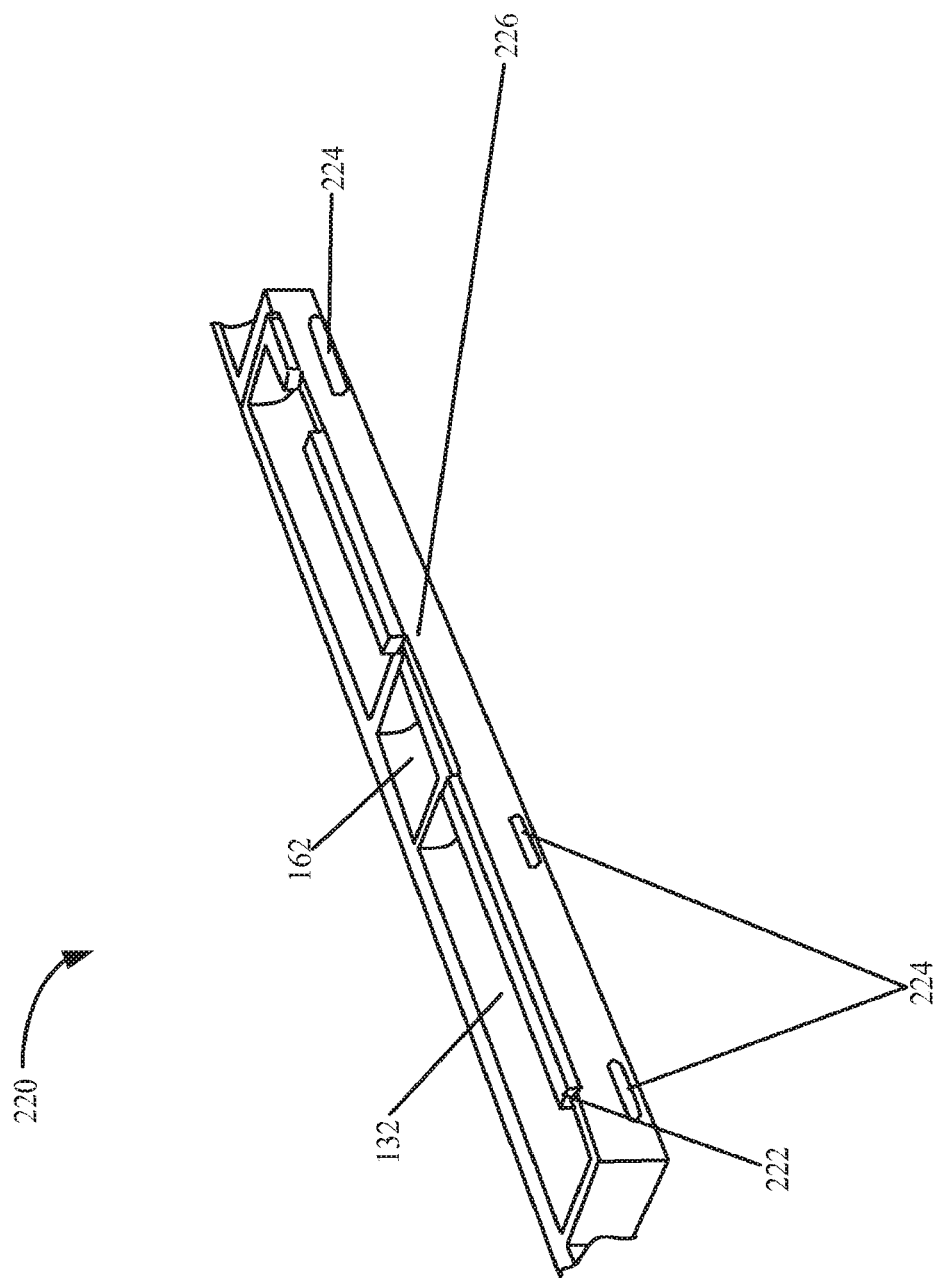
FIG. 6 shows a perspective view of one side of the housing including a cut-out for an RF antenna window in accordance with the described embodiments.

FIG. 6 shows a perspective view of one side of the housing 220 including the cut-out for the RF antenna window 132. The RF antenna window can be configured to support one or more antenna carriers within cavities of the window. In one embodiment, the RF antenna window 132 can include a cavity 162 for supporting an image capture device and/or sensor assembly.

The housing 102 can include a proximately rectangular recess portion in which the RF antenna window 132 is disposed. The bottom of the antenna tray 132 can be curved to conform to an exterior portion of the housing (see FIG. 2). In one embodiment, the antenna tray can be supported by the support wall 226 formed in the housing 102. The RF antenna window 132 can include a lip portion 222 that hangs over the support wall 226. The lip portion 222 can help to prevent the antenna tray from being pulled out of the housing. The RF antenna window 132 can be bonded to the housing using a liquid adhesive. The antenna tray 132 can be bonded along the lip portion and exterior facing surfaces of the support wall 226.

The support wall 226 can include a number of openings, such as openings 224. The openings 224 can be aligned with openings in the RF antenna window 132. The openings can allow wires to be passed through the housing and into the antenna carrier to reach components in the RF antenna window 132, such as one or more antennas and the image capture and/or sensor assembly.

In alternate embodiments, an RF antenna window 132 and its associated antennas can be removed. In this embodiment, the support wall 226 can be removed and the exterior and interior portions of the housing proximate to the antenna location can be formed from the same material as the remaining portions of the housing, such as from a single metal billet. If a image capture device is included at the location shown in FIG. 6, then a image capture device assembly can be attached directly to the housing 102 rather than the RF antenna window. The image capture device assembly (not shown) can be installed on top of a compressible foam. The thickness of the compressible foam can be selected so that the image capture device assembly is slightly pushed against the cover glass when the cover glass is installed. The force may help to keep the image capture device assembly properly aligned with the cover glass.

Figure 7A:
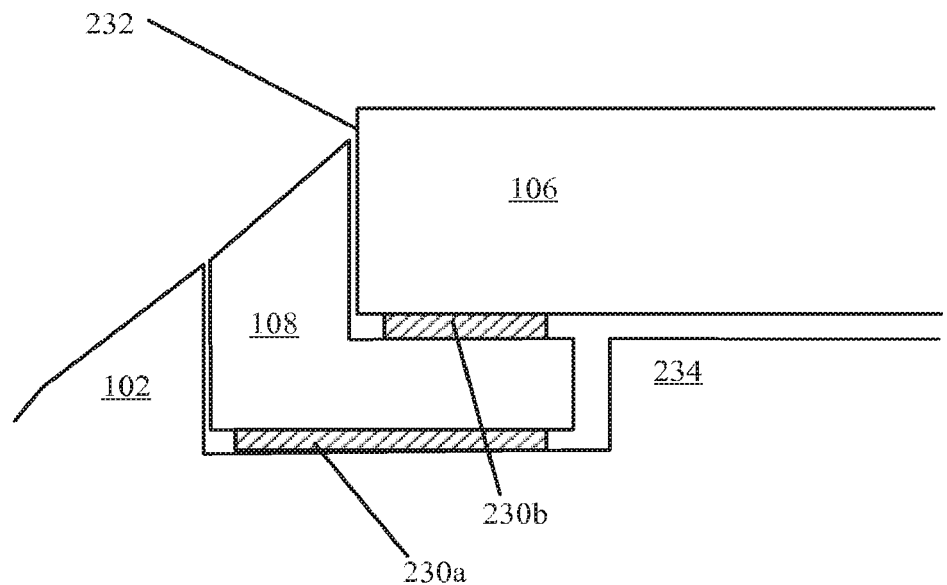
FIGS. 7A and 7B show side views of showing a mechanism for coupling the cover to housing in accordance with the described embodiments.
Figure 7B:
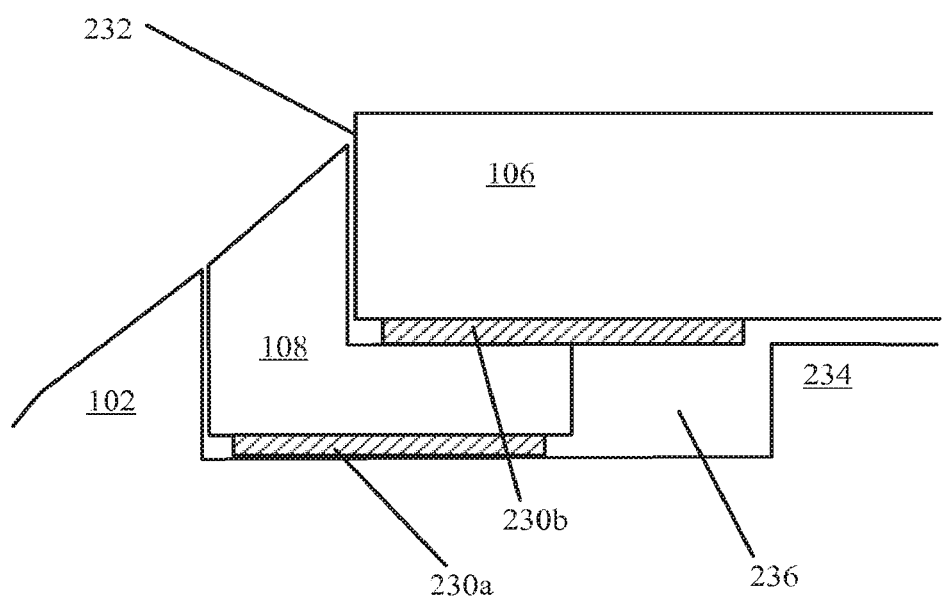

FIGS. 7A and 7B shows a side view of showing a mechanism for coupling the cover to housing. A ledge can be formed on an upper portion of the housing sidewall. The ledge can include a surface for receiving the trim bead 108. Thus, the trim bead 108, which can be a gasket formed from a flexible material, can rest on the ledge of the housing. As described above with respect to FIG. 4, at a number of locations the trim bead 108 can be disposed on top of brackets attached to the housing, such as corner brackets. The trim bead 108 can be bonded to the housing using an adhesive 230a, such as an epoxy or PSA tape. Then, the cover 106 can be bonded to the trim bead 108 using an adhesive, such as 230b, around the perimeter of the housing. The trim bead 108 can help form a seal to the interior of the housing. The seal can help to prevent external contaminants, such as moisture, that may be damaging to internal components from entering into the interior of the housing. In addition, the trim bead 108 can raise the cover 106 such that it does not contact the housing 102, thus, providing cushioning between the housing and the cover 16 that can prevent damage to the cover resulting from the cover impacting with the housing. In one embodiment, the top of the cover glass 106 can extend slightly 232 about the top height of the trim bead 108.

Structure, such as 234, can be located underneath the cover 106. The structure 234 can be associated with components located underneath the cover 106, such as the display assembly. Comparing FIGS. 7A and 7B, it can be seen that amount of underlying structure close to the trim bead 108 can vary. For example, FIG. 7B shows a larger gap 236 between the trim bead 108 and the underlying structure as compared to FIG. 7A. In some embodiments, when gaps, such as 236, are present, the adhesive 230b, such as a PSA tape, can be extended from between the trim bead 108 and the cover 106 and underneath the cover 106 where portions of the PSA tape are bonded to the cover glass but not an underlying surface, such as the trim bead 108, that can provide cushioning for the cover 106 during an impact event.

In this example, the extended adhesive 230b can act as a safety measure if the cover 106 breaks during an impact event. The cover 106 can be formed from a glass material which can break into shards. The extended adhesive 230b can hold the pieces of the broken cover together so that small shards do not break away from the device during the impact event. Thus, the extended adhesive 230b can serve a function similar to safety glass which can include reinforcing components that provide a limited structural integrity to keep the glass from flying apart during an impact event.

FIG. 8 shows a side view of a logo stack-up 250. The housing 102 can include an opening 260 that can be shaped in the form a symbol, such as a logo. In one embodiment, the housing 102 can be less than about 1 mm thick in area sounding the logo. In a particular embodiment, the housing can be about 0.78 mm thick. Material can be removed from a bottom interior surface of the housing such that a ledge including sides 258a and 258b are formed. The ledge can provide a surface for attaching the logo stack-up 250 to the housing 102.

In one embodiment, an insert 256 can be configured to fit within the opening. The insert can be formed from a material, such as a plastic. The logo insert can be thinner than a nominal thickness of the surrounding housing. In one embodiment, the logo insert can be about 0.59 mm thick.

In particular embodiments, the insert can be opaque to light, such as painted black, or formed from an opaque material. In other embodiments, the insert can formed from a translucent material. In one embodiment, the translucent material can be configured to diffuse light from an internal light source, such that the logo appears to be lit when viewed from the exterior.

The logo insert 256 can be bonded to a support structure 252 using an adhesive 254. In particular embodiments, the adhesive can be a tape, such as a pressure sensitive adhesive (PSA) tape or an epoxy, and the support structure can be formed from a sheet of metal, such as a sheet of stainless steel. The metal can be shaped such that it fits around the ledge formed in the housing 102. The support structure 252 can be bonded to the ledge using an adhesive, such as a PSA or an epoxy.

In one embodiment, a conductive tape can be used to ground the support structure 252 to the housing, such as a conductive tape placed over a portion of the housing and a portion of the support structure. In another embodiment, a conductive adhesive can be used to couple the support structure 252 to the housing 102 where the conductive adhesive mechanically attaches and grounds the support structure to the housing. In alternate embodiments, rather than using a separate support structure 252 and logo insert 256, a single piece structure can be used, such as a single piece of molded plastic.

After the logo is installed, a top layer on the interior of the housing can be added. For instance, the top of the sheet of stainless steel can be coated in some manner. In one embodiment, an electrophoretic deposition process can be used to deposit the layer.

The logo stack-up 250 can be part of a fire enclosure associated with the housing 102. The fire enclosure can be configured to contain an exothermic event that has occurred within an interior of the housing, such as an exothermic event associated with the batteries. The metal support structure 252 coupled to the logo insert 256 can help to contain an internal exothermic event.

As described above, the support structure 252 and logo insert 256 can be formed as a single piece. In one embodiment, the single piece can be formed from a metal. The metal can be suitable for use as part of the fire enclosure. However, a cosmetic layer can be applied to a portion of the logo insert 256. In another embodiment, the single piece can be formed from a plastic material. If desired, to improve its fire resistance capabilities, a fire retardant film can be applied over the logo insert 256 within the interior of the housing 102.

Figure 9:
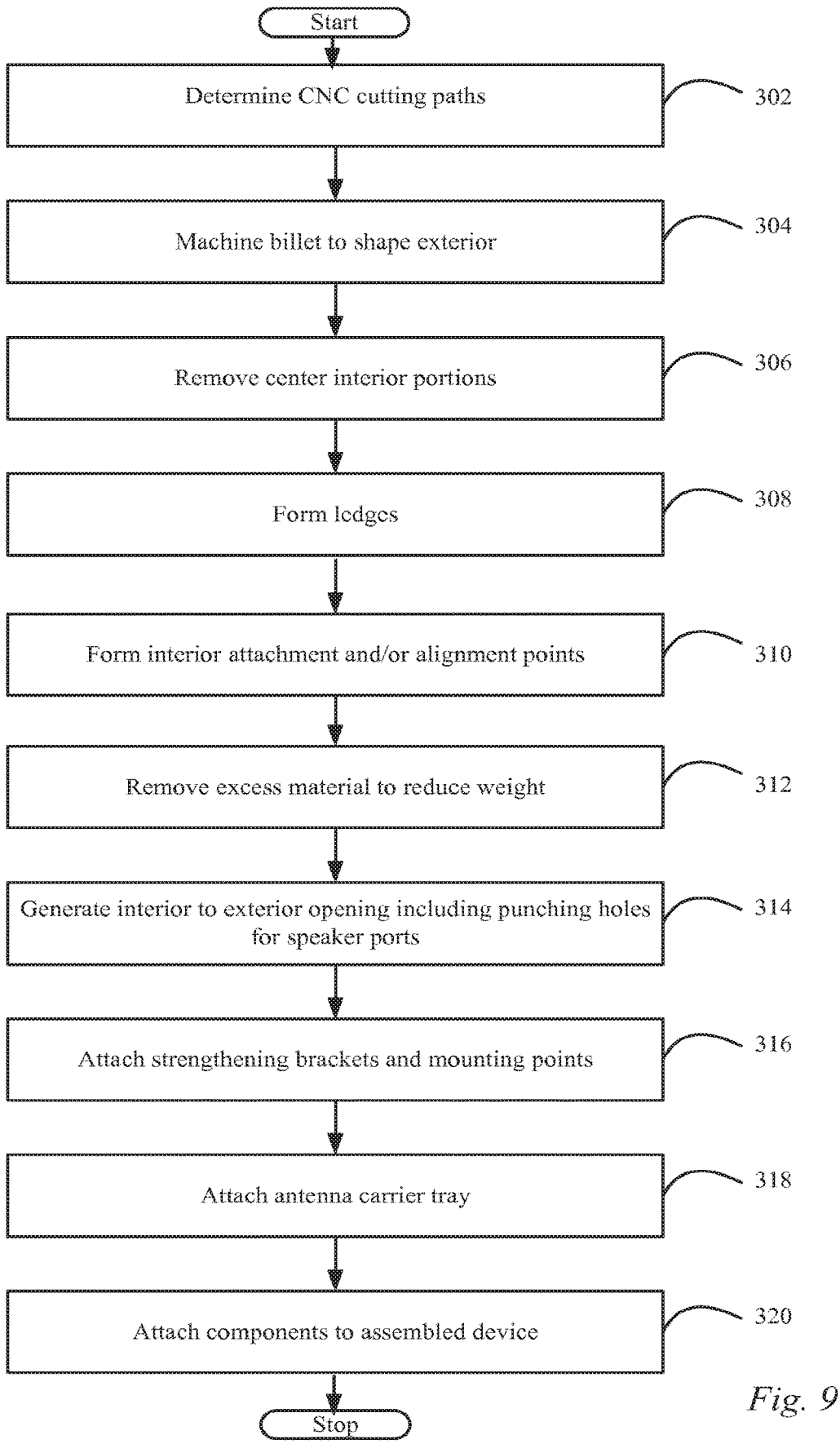
FIG. 9 shows a method of forming a housing for a portable device in accordance with the described embodiments.

FIG. 9 shows a method 300 of forming a housing for a portable device. In one embodiment, the housing can be formed from a single billet of metal, such as a billet of aluminum. In particular embodiments, the billet can be provided as a rectangular sheet with a nominal thickness of about 11 mm where during the machining process about 90% or more of the billet is removed. After machining, the housing can be less than 1 cm thick.

In 302, the CNC cutting paths can be determined for removing material that allows the final housing shape to be formed. The machining paths can be optimized to minimize the machining time and increase the throughput. In 304, the billet can be machined to form an exterior shape for the housing. As described above, in some embodiments, the exterior shape can form a bottom of the device. Typically, the exterior shape and the interior shape of the housing can be machined separately using different processes.

In 306, machining to form the interior shape of the housing can begin. The initial machining can involve removing bulk interior portions of the housing within its center to form a somewhat rectangular shaped cavity. After the bulk machining is performed, in 308 finer machining can begin. For instance, a ledge can be formed around an outer top portion for supporting a cover. The ledge can be formed undercutting into the side of the billet using an appropriate machining tool, such as a bit with a right angle. The top ledge can be machined to include a surface for receiving the trim bead (see 108).

The machining can involve guiding a tool over a particular path in 3-dimensions. In one embodiment, local relative dimensions can be utilized to guide the path of a machining bit. The use of local relative dimensions can involve determining a path from a reference point on the housing as the housing is being machined as opposed to an absolute position associated with a fixture or another non-local dimension associated with the housing. As an example, when undercuts are generated into the sidewalls, the local thickness dimensions of the sidewalls can be used to determine a machining path for the cutting tools as opposed to a distance from the centerline of the housing so that a desired sidewall thickness is maintained. This process can be repeated at different locations on the housing as different cuts are generated. For instance, when machining a ledge for the logo where the housing thickness is relatively thin, a local thickness of the housing at this location can be used to guide the machining process. Using local relative dimensions can reduce machining errors, which can be important for making sure that cuts, such as sidewall cuts, do not result in a housing that is too thin a particular region.

In 312, interior attachment and/or alignment points can be formed. Interior attachment points can be formed as apertures in the housing. In some embodiments, the apertures can be formed as a raised column or "boss" in the material of the housing. In other embodiments, a recess can be formed in the housing that is configured to receive an additional component with an aperture, such as an aperture lined with metal threads, that can serve as an attachment point. The additional component can be attached to the housing using an adhesive. The apertures can be configured to receive fasteners, such as screws. The attachment points can be used to secure components, such as but not limited to a display assembly, speakers, a SIM tray mechanism and PCBs.

Alignment points can be a cavity, aperture or marking that can be used during the assembly process. For instance, the housing can include a recess configured to receive a portion of an alignment fixture. The alignment fixture can be used to align a component by fitting a portion of the alignment fixture into a recess in the housing and another portion into a recess in the component. The component can then be moved relative to the housing until it is brought into alignment at which point it can be secured. In one embodiment, a recess can be provided in the housing and a recess can be provided in a display assembly that can be used with an alignment fixture to align the display assembly relative to the housing.

In 312, the machining can include removing excess material from the housing. Excess material can be removed from various locations, such as underneath the ledges formed in the housing to lighten the weight of housing. In 314, interior to exterior cut-outs can be formed in the housing. For instance, openings can be formed for a data port, SIM card tray, volume switch, a slide switch, power switch and audio jack. In one embodiment, the openings can be formed by machining in a direction normal to the shape of the exterior surface.

In one embodiment, a large number of small holes can be formed in the housing to provide egress for sound generated by one or more internal speakers. The holes can be formed by a hole-punching tool that punches one or more holes at a time. In one embodiment, the holes can be punched along a curved side of the housing from the exterior to the interior of the housing. The holes can be punched over a surface where the curvature is changing, such as a sidewall of the housing. A fixture can be used to rotate the housing such that the holes can be punched proximately normal to the curvature of the exterior surface or to make a cut at some other desired angle.

In particular embodiments, brackets can be coupled to the housing to locally increase the structural integrity of the housing. For instance, a bracket can be mounted near the data port opening on a side of the housing. The data port opening is relatively large and the housing can be thin where the data port is provided. The large opening can weaken the housing. Thus, a support bracket can be added proximate to the data port opening. The support brackets can be bonded to the housing using a bonding agent, such as a liquid adhesive and can be grounded to the housing. In various embodiment, metal brackets can be grounded to the housing using a conductive foam or tape.

In another embodiment, support brackets can be added in corners of the housing. The support brackets can add additional strength that improves the drop test performance of the housing. In one embodiment, the corner brackets can includes a castellation pattern to improve their strength. As previously described, a ledge can be formed around the housing to support a cover. Near the corners, it can be desirable to remove material that forms the ledge in the corner region. The ledge material can be removed so that a mechanism can be installed in the corner. For instance, as described above with respect to FIG. 4, a SIM tray mechanism is installed in one corner of the housing. After the mechanism is installed in a corner where the ledge has been removed, a corner bracket can be attached to form a ledge that lines up with ledges formed on other portions of the housing. The trim bead and then the cover can be attached in the corner using the ledge formed by the corner bracket.

In 318, an RF antenna window can be added to the housing. The RF antenna window can be formed from a radio transparent material, such as a plastic. The antenna carrier can be placed close to an edge of the housing. It can be shaped such that it forms a portion of a continuous exterior portion of the housing. The RF antenna window can be used to mount one or more antenna for receiving wireless data, such as data received from a cellular data network. In 320, additional components, such as the batteries, main logic board, display assembly, trim bead and cover can be attached to the housing until a final assembly configuration is achieved.

Figure 10:
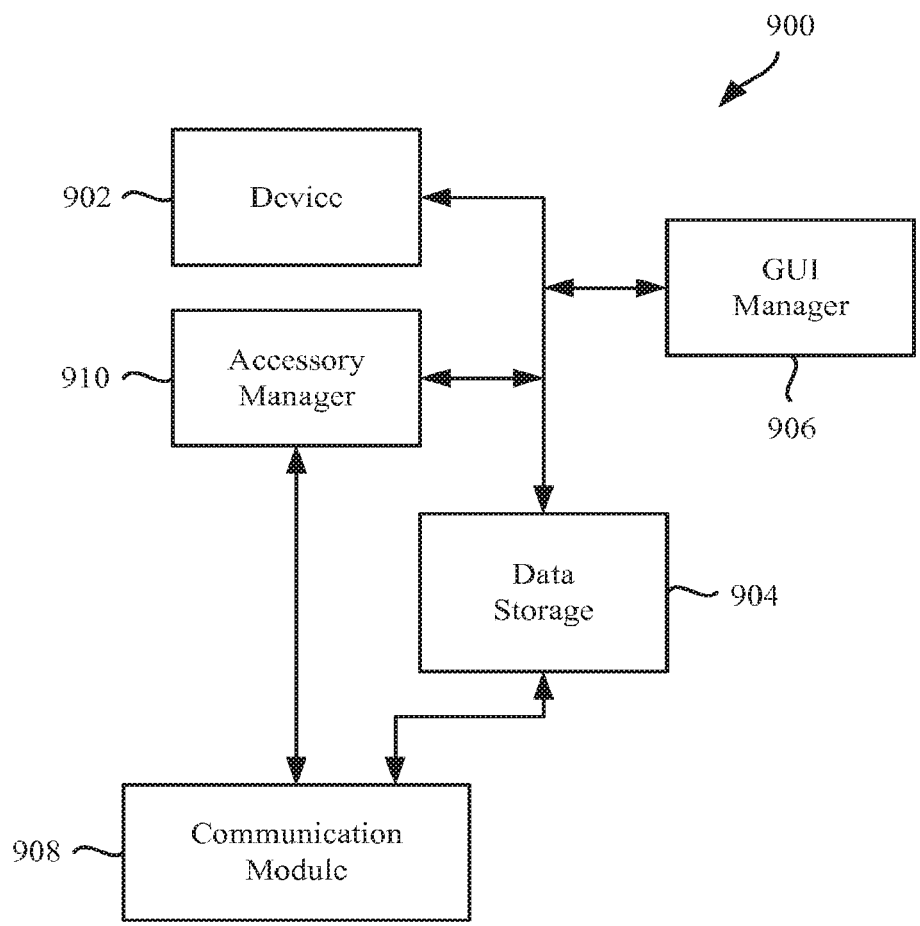
FIG. 10 is a block diagram of an arrangement of functional modules utilized by a portable electronic device in accordance with the described embodiments.
Figure 11:
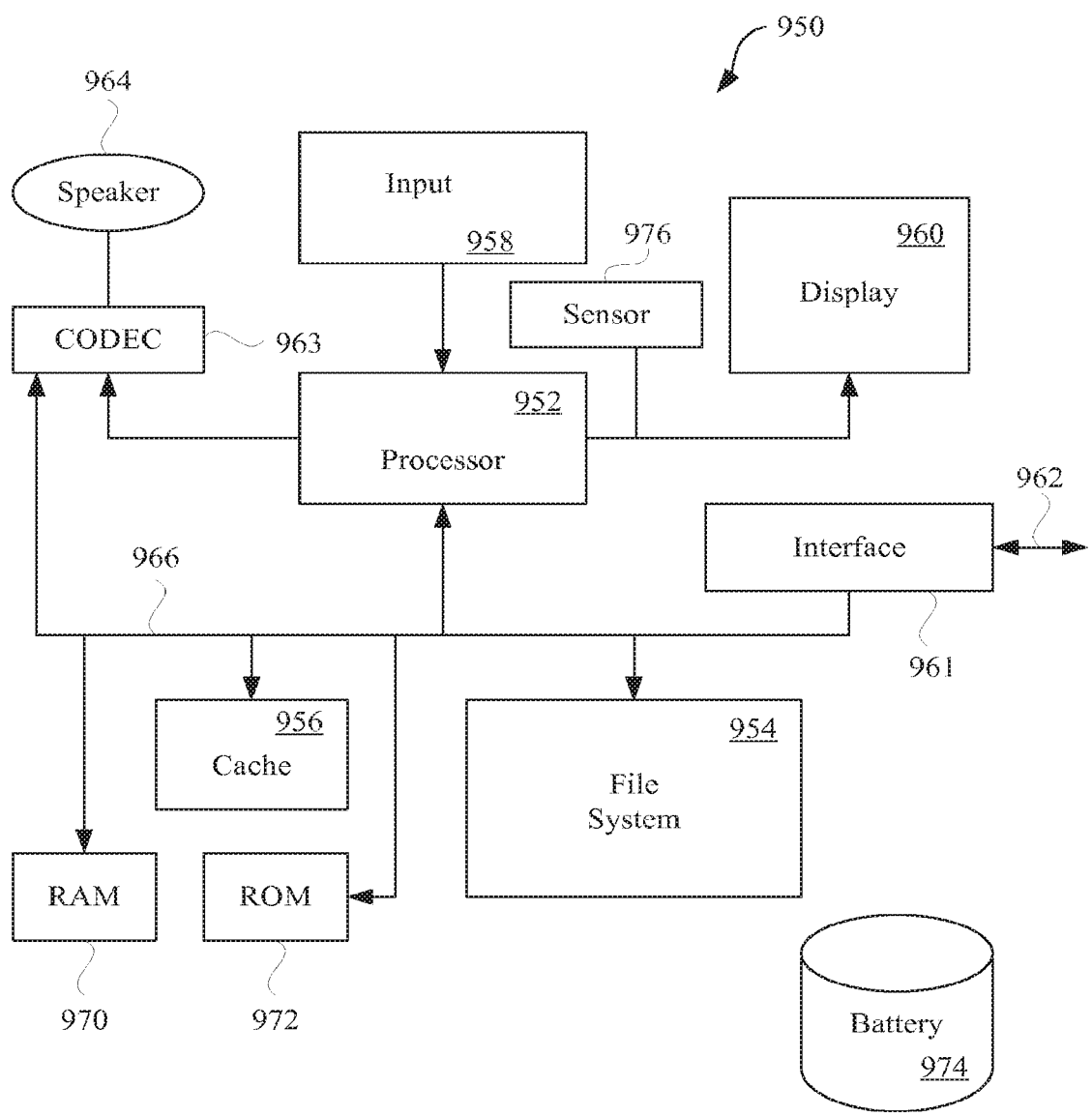
FIG. 11 is a block diagram of an electronic device suitable for use with the described embodiments.

FIG. 10 is a block diagram of an arrangement 900 of functional modules utilized by an electronic device. The electronic device can, for example, be tablet device 100. The arrangement 900 includes an electronic device 902 that is able to output media for a user of the portable media device but also store and retrieve data with respect to data storage 904. The arrangement 900 also includes a graphical user interface (GUI) manager 906. The GUI manager 906 operates to control information being provided to and displayed on a display device. The arrangement 900 also includes a communication module 908 that facilitates communication between the portable media device and an accessory device. Still further, the arrangement 900 includes an accessory manager 910 that operates to authenticate and acquire data from an accessory device that can be coupled to the portable media device.

FIG. 10 is a block diagram of a electronic device 950 suitable for use with the described embodiments. The electronic device 950 illustrates circuitry of a representative portable media device. The electronic device 950 can include a processor 952 that pertains to a microprocessor or controller for controlling the overall operation of the electronic device 950. The electronic device 950 can be configured to store media data pertaining to media items in a file system 954 and a cache 956. The file system 954 can be implemented using a memory device, such as a storage disk, a plurality of disks or solid-state memory, such as flash memory.

The file system 954 typically can be configured to provide high capacity storage capability for the electronic device 950. However, to improve the access time to the file system 954, the electronic device 950 can also include a cache 956. As an example, the cache 956 can be a Random-Access Memory (RAM) provided by semiconductor memory. The relative access time to the cache 956, such as a RAM cache, can be substantially shorter than for other memories, such as flash or disk memory. The cache 956 and the file system 954 may be used in combination because the cache 956 may not have the large storage capacity of the file system 954 as well as non-volatile storage capabilities provided by the memory device hosting the file system 954.

Another advantage of using a cache 956 in combination with the file system 954 is that the file system 954, when active, consumes more power than does the cache 956. The use of cache 956 may decrease the active time of the file system 954 and hence reduce the overall power consumed by the electronic device. The power consumption is often a concern when the electronic device 950 is a portable media device that is powered by a battery 974.

The electronic device 950 can also include other types of memory devices. For instance, the electronic device 950 can also include a RAM 970 and a Read-Only Memory (ROM) 972. In particular embodiments, the ROM 972 can store programs, utilities or processes to be executed in a non-volatile manner. The RAM 970 can be used to provide volatile data storage, such as for the cache 956.

The electronic device 950 can include one or more user input devices, such as input 958 that allow a user of the electronic device 950 to interact with the electronic device 950. The input devices, such as 958, can take a variety of forms, such as a button, keypad, dial, touch screen, audio input interface, video/image capture input interface, input in the form of sensor data, etc. Still further, the electronic device 950 includes a display 960 (screen display) that can be controlled by the processor 952 to display information to the user. A data bus 966 can facilitate data transfer between at least the file system 954, the cache 956, the processor 952, and the CODEC 963.

In one embodiment, the electronic device 950 serves to store a plurality of media items (e.g., songs, podcasts, image files and video files, etc.) in the file system 954. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or video content.

When a user desires to have the electronic device play a particular media item, a list of available media items is displayed on the display 960. Then, using the one or more user input devices, such as 958, a user can select one of the available media items. The processor 952, upon receiving a selection of a particular media item, supplies the media data (e.g., audio file) for the particular media item to one or more coder/decoders (CODEC), such as 963. The CODECs, such as 963, can be configured to produce output signals for an output device, such as speaker 964 or display 960. The speaker 964 can be a speaker internal to the media player 950 or external to the electronic device 950. For example, headphones or earphones that connect to the electronic device 950 would be considered an external speaker.

The electronic device 950 can be configured to execute a number of applications besides media playback applications. For instance, the electronic device 950 can be configured execute communication applications, such as voice, text, e-mail or video conferencing applications, gaming applications, web browsing applications as well as many other different types of applications. A user can select one or more applications for execution on the electronic device 950 using the input devices, such as 958.

The electronic device 950 can include an interface 961 that couples to a data link 962. The data link 962 allows the electronic device 950 to couple to a host computer or to accessory devices. The data link 962 can be provided over a wired connection or a wireless connection. In the case of a wireless connection, the interface 961 can include a wireless transceiver. Sensor 976 can take the form of circuitry for detecting any number of stimuli. For example, sensor 976 can include a Hall Effect sensor responsive to external magnetic field, an audio sensor, a light sensor such as a photometer, a gyroscope, and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. For example, although an extrusion process is preferred method of manufacturing the integral tube, it should be noted that this is not a limitation and that other manufacturing methods can be used (e.g., injection molding). It is therefore intended that the following appended claims be interpreted as including all such alterations, permutations, and equivalents as fall within the true spirit and scope of the described embodiments.

What is claimed is:

1. An electronic device comprising:
    a display;
    a cover positioned over the display;
    a switch
    a housing at least partially enclosing the display and coupled to the cover, the housing comprising:
        a metal component defining at least three sidewalls, a first portion of a bottom of the housing, and a ledge that extends around an opening in the housing, the ledge defining a thinned portion having a width that is reduced with respect to an adjacent portion of the ledge, the cover being coupled to the ledge; and
        a polymer antenna window defining at least a portion of a sidewall and a second portion of the bottom of the housing; and
    an antenna positioned within the housing and below the polymer antenna window; wherein:
    the thinned portion at least partially defines a cavity within the housing;
    the switch is positioned within the cavity; and
    the switch extends at least partially through a switch opening defined in one of the at least three sidewalls.

2. The electronic device of claim 1, wherein the antenna is configured to receive wireless data signals from a cellular data network.

3. The electronic device of claim 1, wherein:
    the bottom of the housing defines a substantially flat portion;
    the sidewall defines a curved portion that extends from the substantially flat portion of the bottom of the housing; and
    the polymer antenna window extends at least partially along the curved portion and ends proximate to the substantially flat portion.

4. The electronic device of claim 3, wherein the polymer antenna window and the metal component cooperate to define a smooth continuous surface.

5. The electronic device of claim 1, wherein:
    the metal component is a machined billet of aluminum material; and
    the metal component defines a speaker grill formed along one of the at least three sidewalls.

6. The electronic device of claim 5, wherein:
    the sidewall defines a curved exterior surface of the electronic device; and
    the speaker grill is defined along the curved exterior surface.

7. The electronic device of claim 5, wherein:
    the metal component defines the opening; and the display is positioned at least partially within the opening.

8. An electronic device comprising:
a housing comprising:
a metal component defining:
a first portion of an external surface of the housing; and
a ledge that extends around an opening in the housing, the ledge having a thinned portion having a width that is reduced with respect to an adjacent portion of the ledge; and
a dielectric component defining a second portion of the external surface of the housing;
a cover attached to the ledge of the housing;
a display positioned below the cover;
a mute button; and
an antenna positioned below the dielectric component and configured to transmit wireless communication signals through the dielectric component wherein:
the thinned portion at least partially defines a cavity within the housing; and
the mute button is positioned within the cavity.

9. The electronic device of claim 8, wherein:
the metal component defines a flat region along a bottom of the housing;
the metal component defines a set of sidewalls that extends from the bottom of the housing; and
the dielectric component is positioned within an opening defined in a sidewall of the set of sidewalls.

10. The electronic device of claim 9, wherein the dielectric component defines at least a portion of a curved portion of the sidewall and extends to the bottom of the housing.

11. The electronic device of claim 8, wherein
the electronic device further comprises an electronic component positioned along the thinned portion.

12. The electronic device of claim 11, wherein the electronic component is part of a switch that extends at least partially through a switch opening defined in a sidewall of the housing.

13. The electronic device of claim 8, wherein:
the cover is formed from a glass sheet;
a trim bead is positioned between an outer edge of the glass sheet and the housing; and
the trim bead is formed from a polymer material.

14. The electronic device of claim 8, wherein:
the metal component defines a set of sidewalls, each sidewall defining a curved surface that extends from a flat region along a back of the housing;
the metal component defines an audio port that extends through a sidewall of the set of sidewalls; and
the audio port is positioned along the curved surface of the sidewall.

15. An electronic device comprising:
a housing comprising a metal component comprising:
a set of sidewalls defining an opening; and
a ledge surrounding the opening and defining a thinned region and a non-thinned region, the thinned region having a width that is narrower than the non-thinned region, the thinned region defining a recess;
a cover attached to the ledge of the housing;
a display positioned below the cover;
a polymer antenna window;
an antenna positioned below the polymer antenna window; and
a speaker positioned within the housing, at least partially within the recess, and proximate to the thinned region of the ledge.

16. The electronic device of claim 15, further comprising a speaker port extending through the housing to the speaker.

17. The electronic device of claim 15, wherein:
the metal component defines a first portion of an exterior surface of the housing; and
the polymer antenna window defines a second portion of the exterior surface of the housing.

18. The electronic device of claim 17, wherein:
the polymer antenna window defines at least a portion of a sidewall of the housing; and
the metal component and the polymer antenna window cooperate to define a smooth continuous surface.

19. An electronic device comprising:
a housing comprising a metal component comprising:
a set of sidewalls defining an opening; and
a ledge surrounding the opening and defining a thinned region and a non-thinned region, the thinned region having a width that is narrower than the non-thinned region;
a cover attached to the ledge of the housing;
a display positioned below the cover;
a polymer antenna window;
an antenna positioned below the polymer antenna window; and
an electronic component positioned within the housing and proximate to the thinned region of the ledge; wherein:
the thinned region at least partially defines a cavity within the housing;
the electronic component is a switch that is positioned within the cavity; and
the switch extends at least partially through a switch opening defined in a sidewall of the set of sidewalls.

20. An electronic device comprising:
a housing comprising a metal component comprising:
a set of sidewalls defining an opening; and
a ledge surrounding the opening and defining a thinned region and a non-thinned region, the thinned region having a width that is narrower than the non-thinned region;
a cover attached to the ledge of the housing;
a display positioned below the cover;
a polymer antenna window;
an antenna positioned below the polymer antenna window; and
an electronic component positioned within the housing and proximate to the thinned region of the ledge; wherein:
the thinned region at least partially defines a cavity within the housing; and
the electronic component is a mute button that is positioned within the cavity.

* * * * *